US006801719B1

(12) United States Patent
Szajewski et al.

(10) Patent No.: US 6,801,719 B1
(45) Date of Patent: Oct. 5, 2004

(54) CAMERA USING BEAM SPLITTER WITH MICRO-LENS IMAGE AMPLIFICATION

(75) Inventors: Richard P. Szajewski, Rochester, NY (US); Lyn M. Irving, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/389,464

(22) Filed: Mar. 14, 2003

(51) Int. Cl.[7] .......................... G03B 41/00; G03B 17/48
(52) U.S. Cl. ..................... 396/333; 396/429; 348/64
(58) Field of Search ............................. 396/322, 333, 396/429; 348/64

(56) References Cited

U.S. PATENT DOCUMENTS

| 992,151 | A | 5/1911 | Berthon |
|---|---|---|---|
| 1,746,584 | A | 2/1930 | Fournier |
| 1,749,278 | A | 3/1930 | Frederick |
| 1,824,353 | A | 9/1931 | Jensen |
| 1,838,173 | A | 12/1931 | Chretien |
| 1,849,036 | A | 3/1932 | Ernst |
| 1,942,841 | A | 1/1934 | Shimizu |
| 1,985,731 | A | 12/1934 | Ives |
| 2,143,762 | A | 1/1939 | Carstaff |
| 2,144,649 | A | 1/1939 | Eggert et al. |
| 2,191,038 | A | 2/1940 | Capstaff |
| 2,252,006 | A | 8/1941 | Holst et al. |
| 2,304,988 | A | 12/1942 | Yule |
| 2,316,644 | A | 4/1943 | Yule |
| 2,407,211 | A | 9/1946 | Yule |
| 2,455,849 | A | 12/1948 | Yule |
| 2,691,586 | A | 10/1954 | Yule et al. |
| 2,992,103 | A | 7/1961 | Land et al. |
| 3,413,117 | A | 11/1968 | Gaynor |
| 3,506,350 | A | 4/1970 | Denner |
| 3,905,701 | A | 9/1975 | David |
| 3,954,334 | A | 5/1976 | Bestenreiner et al. |
| 3,971,065 | A | 7/1976 | Bayer |
| 3,973,953 | A | 8/1976 | Montgomery |

(List continued on next page.)

FOREIGN PATENT DOCUMENTS

| JP | 06044265 | 7/1992 |
|---|---|---|
| JP | 10142685 | 11/1996 |
| JP | 11231372 | 2/1998 |
| JP | 2001-147466 | 5/2001 |

OTHER PUBLICATIONS

Edward M. Crane and C. H. Evans, "Devices for Making Senitometric Exposures on Embossed Kinescope Recording Films" Jan. 1958, pps. 13–16, Journals of the SMPTE vol. 67.

(List continued on next page.)

*Primary Examiner*—Alan A. Mathews
*Assistant Examiner*—Arthur A Smith
(74) *Attorney, Agent, or Firm*—Roland R. Schindler, II

(57) ABSTRACT

In one aspect, an imaging system is provided. The imaging system has a taking lens unit adapted to focus light from a scene, and a beam splitter receiving light from the scene with a portion of the received light traveling from the beam splitter to a first imaging surface and a portion of the received light traveling from the beam splitter to a second imaging surface. A first image capture system is provided for capturing an image based upon the light traveling to the first imaging surface, and a second image capture system is provided for capturing a second image based upon the image formed at the second imaging surface. An array of micro-lenses is in optical association with the first imaging surface, with each micro-lens in the array concentrating a first fraction of the light from the beam splitter onto concentrated image areas of the first imaging surface. Wherein the first image capture system forms an image based upon the light concentrated onto the concentrated image areas.

53 Claims, 14 Drawing Sheets

U.S. PATENT DOCUMENTS

| | | |
|---|---|---|
| 3,973,954 A | 8/1976 | Bean |
| 3,973,957 A | 8/1976 | Montgomery |
| 3,973,958 A | 8/1976 | Bean |
| 4,040,830 A | 8/1977 | Rogers |
| 4,272,186 A | 6/1981 | Plummer |
| 4,458,002 A | 7/1984 | Janssens et al. |
| 4,483,916 A | 11/1984 | Thiers |
| 4,642,678 A | 2/1987 | Cok |
| 4,667,092 A | 5/1987 | Ishihara |
| 5,016,107 A | 5/1991 | Sasson et al. |
| 5,164,831 A | 11/1992 | Kuchta et al. |
| 5,373,322 A | 12/1994 | Laroche et al. |
| 5,440,369 A | 8/1995 | Tabata et al. |
| 5,464,128 A | 11/1995 | Keller |
| 5,649,250 A | 7/1997 | Sasaki |
| 5,668,597 A | 9/1997 | Parulski et al. |
| 5,715,483 A | 2/1998 | Omata et al. |
| 5,731,899 A | 3/1998 | Meyers |
| 5,744,291 A | 4/1998 | Ip |
| 5,751,492 A | 5/1998 | Meyers |
| 5,757,021 A | 5/1998 | Dewaele |
| 5,796,522 A | 8/1998 | Meyers |
| 5,812,322 A | 9/1998 | Meyers |
| 5,822,125 A | 10/1998 | Meyers |
| 5,841,126 A | 11/1998 | Fossum et al. |
| 5,874,994 A | 2/1999 | Xie et al. |
| 5,877,809 A | 3/1999 | Omata et al. |
| 5,965,875 A | 10/1999 | Merrill |
| 6,041,195 A * | 3/2000 | Honda et al. ............... 396/429 |
| 6,067,114 A | 5/2000 | Omata et al. |
| 6,137,535 A | 10/2000 | Meyers |
| 6,141,048 A | 10/2000 | Meyers |
| 6,360,059 B1 * | 3/2002 | Ide et al. .................... 396/114 |
| 6,381,072 B1 | 4/2002 | Burger |

OTHER PUBLICATIONS

J.S. Courtney–Pratt, "Lenticular Plate Multiple Picture Shadowgraph Recording", Sep. 1961, pps. 710–15, Journal of the SMPTE, vol. 70.

C.H.Evans and R.B. Smith, "Color Kinescope Recording on Embossed Films" Jul., 1956, pps. 365–372, Journal of the SMPTE, vol. 65.

Rudolf Kingslake, "The Optics of the Lenticular Color–Film Process", Jan. 1958, pps. 8–13, Journal of the SMPTE, vol. 67.

Furukawa, et al., "A 1/3–inch 380K Pixel (Effective) IT–CCD Image Sensor", Jun. 5, 1992, pps. 595–600, IEEE, vol. 38, No. 3.

Deguchi et al., "Microlens Design Using Simulation Program For CCD Image Sensor", Jun. 5, 1992, pps. 583–589, IEEE, vol. 38, No. 3, Aug. 1992.

* cited by examiner

CAMERA USING BEAM SPLITTER WITH MICRO-LENS IMAGE AMPLIFICATION

CROSS REFERENCE TO RELATED APPLICATIONS

This application is related to a group of seven previously co-filed and commonly assigned U.S. Patent Applications, namely U.S. patent application Ser. No. 10/170,607, entitled Camera Speed Color Film With Base Side Micro-Lenses, filed in the name of Irving et al. on Jun. 12, 2002; U.S. patent application Ser. No. 10/171,012, entitled Lenticular Imaging With Incorporated Beads, filed in the name of Chari et al. on Jun. 12, 2002; U.S. patent application Ser. No. 10/167,746, entitled Camera Speed Color Film With Emulsion Side Micro-Lenses, filed in the name of Szajewski et al. on Jun. 12, 2002; U.S. patent application Ser. No. 10/167,794, entitled Imaging Using Silver Halide Films With Micro-Lens Capture, And Optical Reconstruction, filed in the name of Irving et al. on Jun. 12, 2002; U.S. patent application Ser. No. 10/170,148, entitled Imaging Using Silver Halide Films With Micro-Lens Capture, Scanning And Digital Reconstruction, filed in the name of Szajewski et al. on Jun. 12, 2002; U.S. patent application Ser. No. 10/281,654, entitled Imaging Using Silver Halide Films With Inverse Mounted Micro-Lens And Spacer, filed in the name of Szajewski on Oct. 28, 2002, and U.S. patent application Ser. No. 10/326,455, entitled Imaging System Having Extended Useful Latitude, filed in the name of Szajewski et al. on Dec. 20, 2002, the contents of which are incorporated herein by reference.

FIELD OF THE INVENTION

This invention is related to hybrid and combination imaging systems having beam splitters.

BACKGROUND OF THE INVENTION

Hybrid and combination imaging systems are designed to capture an image of a scene using more than one image capture system. This can be done for a variety of purposes. Often hybrid and combination imaging systems are used to capture images of the same scene using different types of image capture systems.

Such hybrid cameras often use a single taking lens system to collect and focus light from the scene. In such cameras, a beam splitter is used to deliver the same scene image from the taking lens system to separate imaging surfaces in the hybrid or combination camera. The use of beam splitters in cameras having more than one imaging surface has also been known since at least the inception of the "Technicolor" image separation technique for silver halide color image capture in the early-20$^{th}$ century. In the "Technicolor" technique, beam splitters are employed in conjunction with color filters to enable simultaneous capture of color separation images on monochrome film stock. More recently, beam splitters have been proposed for color separation image capture in digital cameras using color filters and monochrome solid state image capture devices.

Other examples of hybrid and combination camera systems that use beam splitters include JP Pat. Pub. No. 10142685A entitled "Silver Salt Photographic and Electronic Image Pickup Camera" filed by Atsushi on Nov. 11, 1996 and J.P. Pat. Pub. No. 11231372, entitled "Camera Provided With Preview Function" filed by Toru on Feb. 17, 1998 each describe hybrid film/electronic image capture systems having a main taking lens system with a beam splitter that deflects a portion of the light traveling through the taking lens system onto an electronic image capture surface and permits another portion of the light passing through the beam splitter to strike a photosensitive film. Beam splitters have also found other uses in hybrid cameras. For example, the Kodak Advantix™ Preview™ camera sold by Eastman Kodak Company, Rochester, N.Y. uses a beam splitter to divide light between one path leading to an optical viewfinder system and another path leading to an electronic imager.

One drawback of the use of such beam splitting systems is that sharing the light captured by a taking lens system to form images at different imaging surfaces inherently reduces the amount of light available at each imaging surface during the time allotted for image capture. This, in turn, reduces the effective sensitivity of each image capture system. In certain applications, the reduction of effective sensitivity may not be preferred.

Thus, there remains a need for image capture systems capable of simultaneous image capture using more than one image capture system without a substantial reduction in the effective sensitivity of each system.

Further there is a need for image capture systems having a reduced dependence upon post capture processing of the electronic image. Such post image capture processing is typically performed because the electronic image is often presented on a display screen that has substantially lower image display resolution than the image capture resolution of the imager used to capture the electronic image. Thus the electronic image must typically be downsampled so that it can be presented on the lower resolution display. Such processing can be time consuming which can delay the presentation of the evaluation image and/or the capture of additional images.

More particularly, there is a need for image capture systems and methods that permit simultaneous capture of images using an imaging system that captures archival images on a photosensitive element and an imaging system that captures images using a solid state imaging surface and generates evaluation images therefrom.

SUMMARY OF THE INVENTION

In one aspect, an imaging system is provided. The imaging system has a taking lens unit adapted to focus light from a scene, and a beam splitter receiving light from the scene with a portion of the received light traveling from the beam splitter to a first imaging surface and a portion of the received light traveling from the beam splitter to a second imaging surface. A first image capture system is provided for capturing an image based upon the light traveling to the first imaging surface, and a second image capture system is provided for capturing a second image based upon the image formed at the second imaging surface. An array of micro-lenses is in optical association with the first imaging surface, with each micro-lens in the array concentrating a first fraction of the light from the beam splitter onto concentrated image areas of the first imaging surface. Wherein the first image capture system forms an image based upon the light concentrated onto the concentrated image areas.

In another aspect, an image capture system is provided. The imaging system has a taking lens unit adapted to focus light toward a beam splitter and a beam splitter receiving light from the taking lens unit and passing a portion of light to form an image at a first imaging surface and a portion of the light to form an image at a second imaging surface. A photosensitive element image capture system having a shutter assembly controls the passage of light to at least one imaging surface and a photosensitive element positioning system having a gate positioning a photosensitive element having the first imaging surface thereon to receive light controlled by the shutter assembly. An electronic image capture system is provided having an image sensor with the second imaging surface thereon said electronic image capture system is adapted to capture an image based upon the light incident on the second image surface and a micro-lens array in optical association with the second imaging surface imaging plane concentrating light directed at concentrated image areas of the second imaging surface. A controller determines a capture time and enables the shutter assembly and electronic image capture system to capture an image representative of scene conditions during the capture time.

In another aspect, an imaging system is provided. The imaging systems has a taking lens unit adapted to focus light from a scene and an image capture system for capturing an image based upon the light traveling to an imaging surface. A stacked array magnifier is positioned to alter the effective magnification of the light traveling to the imaging surface. An array of micro-lenses in optical association with the imaging surface, with each micro-lens in the array concentrating a first fraction of the light onto concentrated image areas of the imaging surface. Wherein the image capture system forms an image based upon the light concentrated onto the concentrated image areas.

In still another aspect, a method for capturing an image of a scene using a first imaging surface having a first sensitivity and a second imaging surface having a second sensitivity is provided. In accordance with the method, light from the scene is focused and the focused light from the scene is divided into a first portion traveling to a first imaging surface and a second portion traveling to a second imaging surface. A fraction of the light traveling along the first axis is concentrated to form a pattern of concentrated image elements on the first imaging surface. A first image is formed based upon the pattern of concentrated image elements formed on the first imaging surface. A second image is formed based upon the light reaching the second imaging surface.

DETAILED DESCRIPTION OF THE INVENTION

Figure 1:
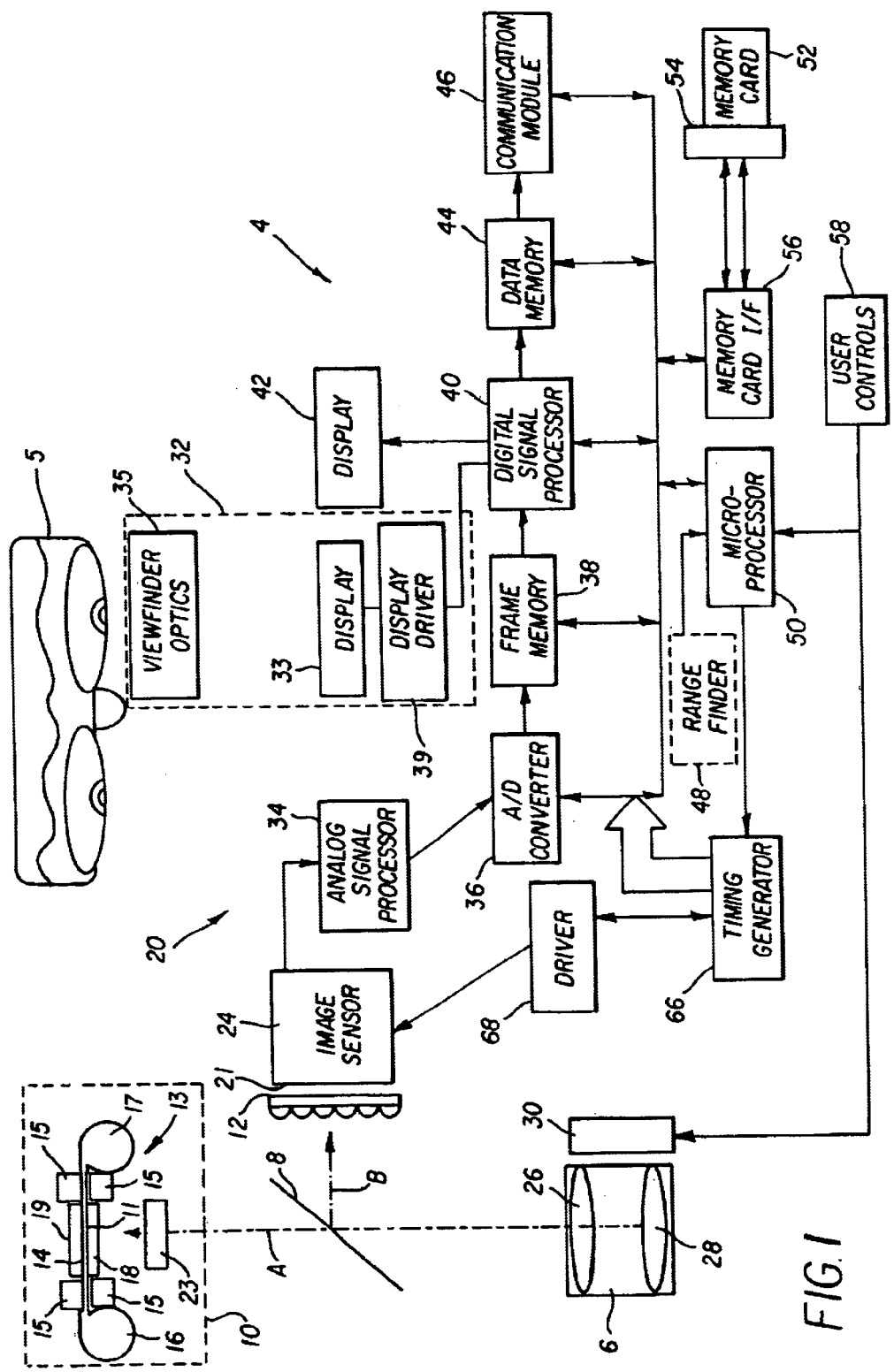
FIG. 1 is an illustration of an embodiment of an imaging system of the present invention.

FIG. 1 shows a block diagram of one embodiment of an imaging system 4. As is shown in FIG. 1, imaging system 4 includes a taking lens unit 6, which focuses light from a scene (not shown) along a first axis A. Imaging system 4 further includes a beam splitter 8. Beam splitter 8 receives light traveling along first axis A and passes a portion of the received light so that it continues to travel along first axis A. Beam splitter 8 also directs another portion of the received light along a second axis B.

Beam splitter 8 can be any conventional beam splitter as known in the optical arts. In certain embodiments, beam splitter 8 can comprise an angled glass surface, partially silvered mirrors, a beam splitting prism and/or a combination thereof. Beam splitter 8 can operate by passing a first portion of the received light through beam splitter 8 so that the first portion continues to travel along first axis A while also directing a second portion of the received light in a second direction as described above. Alternatively, beam splitter 8 can direct a portion of the received light traveling along first axis A so that one portion of the light travels along second axis B and another portion of the light from taking lens unit 6 along a third axis (not shown), with the first, second and third axes being different.

Imaging system 4 has more than one image capture system with a first image capture system 10 being provided having a first imaging surface 11 for capturing an image based upon light that travels along first axis A and a second image capture system 20 being provided having a second imaging surface 21 for capturing an image of the scene based upon light that travels along second axis B. In the embodiment shown, first imaging surface 11 comprises a surface on a conventional photosensitive element 14 such as a film or a plate. Also in the embodiment of FIG. 1, second imaging surface 21 comprises a surface on an electronic image sensor 24 that is positioned to receive light directed by beam splitter 8 along second axis B. The operation of the first image capture system 10 and the second image capture system 20 will be discussed in detail below.

Because beam splitter 8 divides the light from taking lens unit 6 between first imaging surface 11 and second imaging surface 21, the amount of light that reaches each imaging surface per unit of time is reduced and consequently, the effective system sensitivities of the first image capture system 10 and the second image capture system 20 are reduced. However, as is shown, in FIG. 1, a micro-lens array 12 is optically associated with one of the imaging surfaces and enhances the exposure at selected portions of the associated imaging surfaces. This effectively increases the sensitivity of the selected portions and effectively decreases the sensitivity of other portions. This increased sensitivity can be used to compensate for the loss of the light that is displaced by beam splitter 8 so that an image formed using imaging information from the selected portions will have the appearance of an image captured with a system having greater sensitivity. In certain embodiments described below, imaging information is obtained from both regions having increased and decreased sensitivity and this imaging information is combined to form an image having an effectively increased overall dynamic range.

It will be appreciated that beam splitter 8 can be adapted to direct a principal portion of the light from a scene toward first imaging surface 11 while directing the remaining portion of the light from the scene toward second imaging surface 21 that is optically associated with a micro-lens array 12 to compensate for the reduced provision of light at second imaging surface 21. This allows first image capture system 10 to use conventional image capture techniques to form an image using the light that strikes the first imaging surface. In this regard, the degree of concentration provided by the micro-lenses can be defined so that the effective sensitivity or effective dynamic range of the second image capture system 20 to the concentrated light will approximate the response of the first imaging surface to the light from beam splitter 8.

For example, in one potential embodiment of the imaging system 4 shown in FIG. 1, beam splitter 8 passes between 75 percent and 95 percent of the light from taking lens unit 6 to first imaging surface 11 and directs the remaining portions of light from taking lens unit 6 to second imaging surface 21. In this example, array of micro-lenses 12 is positioned in optical association with second imaging surface 21 and adapted to concentrate light received in the second optical path B so that second image capture system 20 can derive an image from light concentrated by micro-lens array 12 to form an image having an apparent sensitivity that approximates the sensitivity of the first image capture system 10. Beam splitter 8 can direct proportions of light between alternate paths in other ratios. The distribution of light by beam splitter 8 can be at any distribution ratio consistent with the intended use. For image capture systems that have grossly similar native sensitivities, the distribution is generally at a ratio of between 19:1 and 1:19, preferably at a ratio of between 3:1 and 1:3, and more preferable at a ratio of between 2:1 and 1:2. More disparate ratios can be employed with image capture systems that have grossly different native sensitivities.

First Image Capture System

In the embodiment shown in FIG. 1 first image capture system 10 comprises a photosensitive element positioning system 13 and a shuttering system 23. Photosensitive element positioning system 13 has a gate system 15 that positions photosensitive element 14 to receive an image formed by light from the scene traveling along first axis A. Where photosensitive element 14 is adapted to record multiple images on separate image areas of photosensitive element 14 such as where photosensitive element 14 comprises a roll of a flexible film capable of receiving images in multiple frame areas, photosensitive element positioning system 13 can also comprise a film supply system 16 and a film take up system 17 that cooperate to advance photosensitive element 14 between frame areas. Film supply system 16 and film take up system 17 can comprise many well known conventional structures and mechanisms for advancing and positioning a photosensitive element 14.

In the embodiment shown in FIG. 1, photosensitive element positioning system 13 is also shown including an optional contact surface 18 which is used to help establish the positioning, flatness and alignment of photosensitive element 14. Where contact surface 18 is provided, photosensitive element 14 is brought against photosensitive element contact surface 18 prior to image capture. Contact surface 18 provides a rigid flat structure that is positioned at an appropriate location to receive the image. Photosensitive element contact surface 18 is adapted to contact photosensitive element 14 without damaging photosensitive element 14 and to hold photosensitive element 14 in a manner that improves the positioning flatness and alignment of photosensitive element 14. Photosensitive element contact surface 18 can, for example, have matte beads (not shown) distributed thereon as are known in the art of photography. Such matte beads can have a diameter of between 0.1 to 2 micro-meters and a distribution generally covering the surface area of photosensitive element contact surface 18. Coatings of various materials can also be used, such as, for example, mineral oil, silicone oil and carnuba wax. Other materials that can usefully be used with photosensitive element contact surface 18 are described in a paper entitle "Coating Physical Property Modifying Addenda" IX published in Research Disclosure 38957, Volume 389 in September 1996. It is recognized that insertion of optional element contact surface 18 introduces additional refractive surfaces which can be accommodated as is well understood in the optical arts.

As is also shown in FIG. 1, an optional pressure plate assembly 19 is used to position photosensitive element 14 against element contact surface 18. Optional pressure plate assembly 19 can be formed by guides or rails integral to a film positioning system 13, or gate system 15. Photosensitive element contact surface 18 and optional pressure plate assembly 19 can be individually or collectively reversibly compressible and act to passively position photosensitive element 14 in a position to receive light from the scene.

Shutter system 23 is disposed between the light from the scene and photosensitive element 14. Shutter system 23 is adapted to control the passage of light from the scene to first imaging surface 11. Shutter system 23 passes light from the scene in response to signals generated by user controls 58 or microprocessor 50. These signals cause shutter system 23 to move from a closed state that prevents light from passing to an open state that permits light to pass for a first capture period. At the end of the first capture period, shutter system 23 returns to the closed state. The duration of the first capture period can be fixed or it can be determined, for example, by microprocessor 50 using conventional algorithms that are based upon the amount of light from the scene as determined by using photosensors well known in the art, and information indicating the photosentivity of the photosensitive element 14. The amount of light in the scene can be determined using a photosensor (not shown) and using conventional exposure determining algorithms. Alternatively, image sensor 24 can be used to determine the amount of light in the scene. Similarly, the photosensitivity of photosensitive element 14 can be determined, for example, by analysis of markings on a film canister, or by using other means well known in the art.

The operation of taking lens unit 6 will now be described in greater detail. Taking lens unit 6 focuses light from the scene so that light passing through beam splitter 8 forms an image of the scene at first imaging surface 11 and second imaging surface 21. Optionally additional optical elements (not shown) can be interposed between beam splitter 8 and first imaging surface 11 and/or second imaging surface 21 to help focus light so that corresponding images are formed at first imaging surface 11 and/or second imaging surface 21.

Taking lens unit 6 can be simple, such as having a single focal length with manual focusing or a fixed focus. In the example embodiment shown in FIG. 1, taking lens unit 6 is a motorized 2× zoom lens unit in which a mobile element or combination of elements 26 are driven, relative to a stationary element or combination of elements 28 by a lens driver 30. In the embodiment shown, lens driver 30 controls both the lens focal length and the lens focus position. A viewfinder system 32 presents images captured by image sensor 24 to user 5 to help user 5 to compose images. The operation of viewfinder system 32 will be described in detail below.

Various methods can be used to determine the focus settings of taking lens unit 6. In a preferred embodiment, image sensor 24 is used to provide multi-spot autofocus using what is called the "through focus" or "whole way scanning" approach. The scene is divided into a grid of regions or spots, and the optimum focus distance is determined for each image region. The optimum focus distance for each region is determined by moving taking lens system 6 through a range of focus distance positions, from the near focus distance to the infinity position, while capturing images. Depending on the camera design, between four and thirty-two images may need to be captured at different focus distances. Typically, capturing images at eight different distances provides suitable accuracy.

The captured image data is then analyzed to determine the optimum focus distance for each image region. This analysis begins by band-pass filtering the sensor signal using one or more filters, as described in commonly assigned U.S. Pat. No. 5,874,994 "Filter Employing Arithmetic Operations for an Electronic Synchronized Digital Camera" filed by Xie et al., on Dec. 11, 1995, the disclosure of which is herein incorporated by reference. The absolute value of the bandpass filter output for each image region is then peak detected, in order to determine a focus value for that image region, at that focus distance. After the focus values for each image region are determined for each captured focus distance position, the optimum focus distances for each image region can be determined by selecting the captured focus distance that provides the maximum focus value, or by estimating an intermediate distance value, between the two measured captured focus distances which provided the two largest focus values, using various interpolation techniques.

The lens focus distance to be used to capture the final high-resolution still image can now be determined. In a preferred embodiment, the image regions corresponding to a target object (e.g. a person being photographed) are determined. The focus position is then set to provide the best focus for these image regions. For example, an image of a scene can be divided into a plurality of subdivisions. A focus evaluation value representative of the high frequency component contained in each subdivision of the image can be determined and the focus evaluation values can be used to determine object distances as described in commonly assigned U.S. Pat. No. 5,877,809 entitled "Method Of Automatic Object Detection In An Image", filed by Omata et al. on Oct. 15, 1996, the disclosure of which is herein incorporated by reference. If the target object is moving, object tracking may be performed, as described in commonly assigned U.S. Pat. No. 6,067,114 entitled "Detecting Compositional Change in Image" filed by Omata et al. on Oct. 26, 1996, the disclosure of which is herein incorporated by reference. In an alternative embodiment, the focus values determined by "whole way scanning" are used to set a rough focus position, which is refined using a fine focus mode, as described in commonly assigned U.S. Pat. No. 5,715,483, entitled "Automatic Focusing Apparatus and Method", filed by Omata et al. on Oct. 11, 1998, the disclosure of which is herein incorporated by reference.

In one embodiment, the bandpass filtering and other calculations used to provide autofocus in imaging system 4 are performed by digital signal processor 40. In this embodiment, imaging system 4 uses a specially adapted image sensor 24, as is shown in commonly assigned U.S. Pat. No 5,668,597 entitled "Electronic Camera With Rapid Autofocus Upon An Interline Image Sensor", filed by Paruiski et al. on Dec. 30, 1994, the disclosure of which is herein incorporated by reference, to automatically set the lens focus position. As described in the '597 patent, only some of the lines of sensor photoelements (e.g. only ¼ of the lines) are used to determine the focus. The other lines are eliminated during the sensor readout process. This reduces the sensor readout time, thus shortening the time required to focus taking lens unit 6.

In an alternative embodiment, imaging system 4 uses a separate optical or other type (e.g. ultrasonic) of rangefinder 48 to identify the subject of the image and to select a focus position for taking lens unit 6 that is appropriate for the distance to the subject. Rangefinder 48 operates lens driver 30, directly or as shown in FIG. 1 microprocessor 50 uses information from rangefinder 48, to move one or more mobile elements 26 of taking lens unit 6. Rangefinder 48 can be passive or active or a combination of the two. A wide variety of multiple sensor rangefinders 48 known to those of skill in the art are suitable for use. For example, U.S. Pat. No. 5,440,369 entitled "Compact Camera With Automatic Focal Length Dependent Exposure Adjustments" filed by Tabata et al. on Nov. 30, 1993, the disclosure of which is herein incorporated by reference, discloses such a rangefinder 48. Rangefinder 48 can operate lens driver 30 directly or as is shown in the embodiment of FIG. 1, rangefinder 48 can provide data to microprocessor 50. In the latter embodiment, microprocessor 50 uses this data to determine how to move one or more mobile elements 26 of taking lens unit 6 to set the focal length and lens focus position of taking lens unit 6.

The focus determination made by rangefinder 48 can be of the single-spot or multi-spot type. Preferably, the focus determination uses multiple spots. In multi-spot focus determination, the scene is divided into a grid of regions or spots, and the optimum focus distance is determined for each spot.

Once the optimum distance to the subject is determined, microprocessor 50 causes lens driver 30 to adjust the at least one element 26 to set the focal length and lens focus position of taking lens unit 6. In the embodiment of FIG. 1, a feedback loop is established between lens driver 30 and microprocessor 50 so that microprocessor 50 can accurately set the focal length and the lens focus position of taking lens unit 6.

Second Image Capture System

Figure 2:
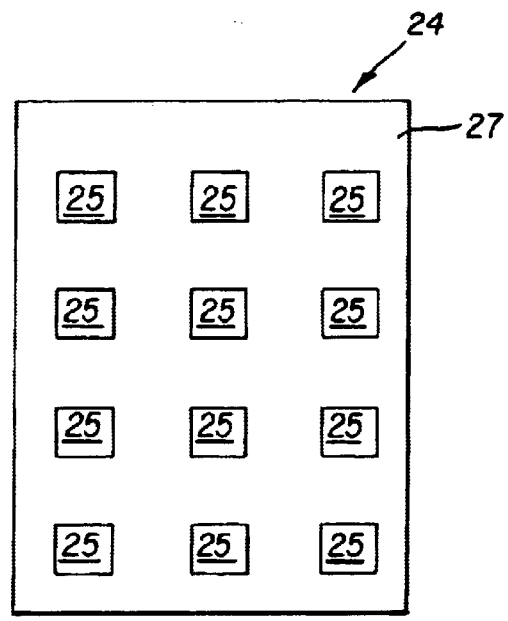
FIG. 2 schematically illustrates a face view of an image sensor.

FIG. 2 shows a face view of image sensor 24. As can be seen in FIG. 2 image sensor 24 has a discrete number of photosensors 25 arranged in a two-dimensional array. Image sensor 24 can take many forms, for example image sensor 24 can be a conventional charge coupled device (CCD) sensor, a complementary metal oxide semiconductor (CMOS) image sensor and/or a charge injection device (CID). In one example embodiment, image sensor 24 has an array of 2448×1632 photosensitive elements or photosensors 25. Photosensors 25 of image sensor 24 convert photons of light from the scene into electron charge packets. Each photosensor 25 is surrounded with inactive areas 27 such as isolation regions, interconnecting circuitry and useful structures known to those of ordinary skill in the art. Each photosensor 25 on image sensor 24 corresponds to one pixel of an image captured by image sensor 24, referred to herein as an initial image.

In one embodiment, where image sensor 24 is used to capture color images, each photosensor 25 is also overlaid with a color filter array, such as the Bayer color filter array described in commonly assigned U.S. Pat. No. 3,971,065, entitled "Color Imaging Array" filed by Bayer on Mar. 7, 1975, the disclosure of which is herein incorporated by reference. The Bayer color filter array has 50% green pixels in a checkerboard mosaic, with the remaining pixels alternating between red and blue rows. Each photosensor 25 responds to the appropriately colored incident light illumination to provide an analog signal corresponding to the intensity of illumination incident on the photosensor 25. Various other color filter arrays can be used. A color filter can be omitted where image sensor 24 is used to capture grey scale or so-called black and white images. In another embodiment, color images can be captured by wavelength specific color exposure depth interrogation as described in U.S. Pat. No. 5,965,875 entitled "Color Separation in an Active Pixel Cell Imaging Array Using a Triple Well Structure," filed by Merrill on Apr. 24, 1998.

The process by which second image capture system 20 converts information from image sensor 24 into a digital image will now be described with reference to FIG. 1. The analog output of each photosensor 25 is amplified by an analog amplifier (not shown) and analog processed by an analog signal processor 34 to reduce the output amplifier noise of image sensor 24. The output of the analog signal processor 34 is converted to a captured digital image signal by an analog-to-digital (A/D) converter 36, such as, for example, a 10-bit A/D converter that provides a 10 bit signal in the sequence of the Bayer color filter array.

The digitized image signal is temporarily stored in a frame memory 38, and is then processed using a programmable digital signal processor 40 as described in commonly assigned U.S. Pat. No. 5,016,107 entitled "Electronic Still Camera Utilizing Image Compression and Digital Storage" filed by Sasson et al. on May 9, 1989, the disclosure of which is herein incorporated by reference. The image processing includes an interpolation algorithm to reconstruct a full resolution color initial image from the color filter array pixel values using, for example, the methods described in commonly assigned U.S. Pat. No. 5,373,322 entitled "Apparatus and Method for Adaptively Interpolating a Full Color Image Utilizing Chrominance Gradients" filed by LaRoche et al. on Jun. 30, 1993, and U.S. Pat. No. 4,642,678 entitled "Signal Processing Method and Apparatus for Producing Interpolated Chrominance Values in a Sampled Color Image Signal" filed by Cok on Feb. 3, 1986, the disclosures of which are herein incorporated by reference. White balance, which corrects for the scene illuminant, is performed by multiplying the red and blue signals by a correction factor so that they equal green for neutral (i.e. white or gray) objects. Preferably, color correction uses a 3×3 matrix to correct the camera spectral sensitivities. However, other color correction schemes can be used. Tone correction uses a set of look-up tables to provide the opto-electronic transfer characteristic defined in the International Telecommunication Union standard ITU-R BT.709. Image sharpening, achieved by spatial filters, compensates for lens blur and provides a subjectively sharper image. Luminance and chrominance signals are formed from the processed red, green, and blue signals using the equations defined in ITU-R BT.709.

Digital signal processor 40 uses the initial images to create archival images of the scene. Archival images are typically high resolution images suitable for storage, reproduction, and sharing. Archival images are optionally compressed using the JPEG standard and stored in data memory 44. The JPEG compression standard uses the well-known discrete cosine transform to transform 8×8 blocks of luminance and chrominance signals into the spatial frequency domain. These discrete cosine transform coefficients are then quantized and entropy coded to produce JPEG compressed image data. This JPEG compressed image data is stored using the so-called "Exif" image format defined in "The Exchangeable Image File Format (Exif)" version 2.1, published by the Japan Electronics and IT Industries Association JEITA CP-3451. The Exif format archival image can also be stored in memory card 52. In the embodiment of FIG. 1, imaging system 4 is shown having a memory card slot 54 which holds removable memory card 52 and has a memory card interface 56 for communicating with memory card 52. An Exif format archival image and any other digital data can also be transmitted to a host computer or other device (not shown), which is connected to imaging system 4 through a communication module 46.

Communication module 46 can take many known forms. For example, any known optical, radio frequency or other transducer can be used. Such transducers convert image and other data into a form such as an optical signal, radio frequency signal, or other form of signal that can be conveyed by way of a wireless, wired, or optical network such as a cellular network, satellite network, cable network, telecommunication network, the internet or any other communication path to a host computer (not shown), network (not shown) or other device including but not limited to a printer, internet appliance, personal digital assistant, telephone or television.

Digital signal processor 40 also creates smaller size digital images based upon the initial images. These smaller sized images are referred to herein as evaluation images. Typically, the evaluation images are lower resolution images adapted for display on viewfinder display 33 or exterior display 42. Viewfinder display 33 and exterior display 42 can comprise, for example, a color liquid crystal display (LCD), organic light emitting display (OLED) also known as an organic electroluminescent display (OELD) or a subset of the OLED type display that uses polymeric compounds to emit light (also known as a PLED). Any other type of video display can also be used.

Image Capture Sequence

The process by which images are captured will now be described. The steps of this process are referred to herein collectively as an "image capture sequence". As used herein, the term "image capture sequence" comprises at least an image capture phase and can optionally also include a composition phase and a verification phase.

During the composition phase, microprocessor 50 sends signals to a timing generator 66 indicating that images are to be captured. Timing generator 66 is connected generally to the elements of second image capture system 20, as shown in FIG. 1, for controlling the digital conversion, compression, and storage of the image signal. Image sensor 24 is driven from timing generator 66 via sensor driver 68. Microprocessor 50, timing generator 66 and sensor driver 68 cooperate to cause image sensor 24 to collect charge in the form of light from a scene for an integration time also referred to herein as a second capture time that is either fixed or variable. After the second capture time is complete an image signal is provided to analog signal processor 34 and converted into evaluation images as is generally described above.

A stream of initial images is captured in this way and digital signal processor 40 generates a stream of evaluation images based upon the initial images. The stream of evaluation images is presented on viewfinder display 33 or exterior display 42. User 5 observes the stream of evaluation images and uses the evaluation images to compose the image. The evaluation images can be created as described above using, for example, resampling techniques such as are described in commonly assigned U.S. Pat. 5,164,831 entitled "Electronic Still Camera Providing Multi-Format Storage Of Full And Reduced Resolution Images" filed by Kuchta et al., on Mar. 15, 1990, the disclosure of which is herein incorporated by reference. The evaluation images can also be stored, for example, in data memory 44.

During the capture phase, microprocessor 50 sends a capture signal causing digital signal processor 40 to obtain an initial image and to process the initial image to form an evaluation image. During the capture phase, microprocessor 50 also sends a signal causing shutter system 23 to expose photosensitive element 14 to light from the scene for a capture time during which the photosensitive element 14 collects light from the scene to form an image. Microprocessor 50 also sends a capture signal to second image capture system 20 causing digital signal processor 40 to select an initial image as an evaluation image and, optionally, to process the initial image to form an additional archival image.

First image capture system 10 and second image capture system 20, form images based upon light that is received during the first capture time and a second capture time respectively. Depending on the sensitivities of the imaging surfaces used to collect light, the capture time used by one imaging system to capture an image can be different from the capture time used by the other imaging system to capture an image. Microprocessor 50 determines an appropriate capture time for each image capture system based upon scene conditions, knowledge of the sensitivity of the first imaging surface 11 and the second imaging surface 21, and based upon the type of photography being performed, causes appropriate signals to be generated for the capture of images by each image capture system. Various conventional algorithms can be used to define the first capture time and second capture time for either or both of the image capture systems.

During the verification phase, the evaluation image is adapted for presentation on viewfinder display 33 and/or exterior display 42 and is presented for a period of time. This permits user 5 to verify that the appearance of the captured archival image is acceptable. Because both the archival image and the evaluation image are derived from a single optical system, i.e. taking lens unit 6, these images contain the same image information and it is not necessary to correct for parallax problems created in evaluation images when one optical system is used to provide an archival image of a scene to a first image capture system 10 and a second, separate, optical system is used to provide a second image capture system 20 used to capture evaluation images.

Figure 3:
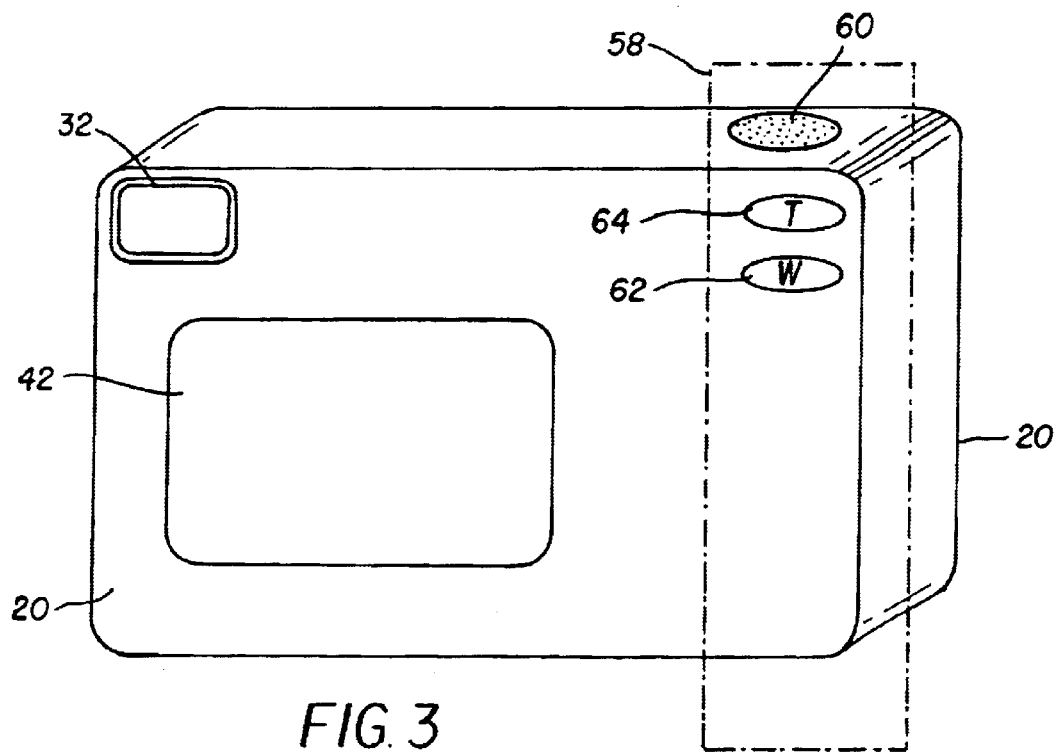
FIG. 3 is an illustration of a back view of the imaging system of FIG. 1.

Imaging system 4 is controlled by user controls 58, some of which are shown in more detail in FIG. 3. User controls 58 can comprise any form of transducer or other device capable of receiving input from user 5 and converting this input into a form that can be used by microprocessor 50 in operating imaging system 4. For example, user controls 58 can comprise touch screen input a 4-way switch, a 6-way switch, an 8-way switch, stylus system, track ball system, joy stick system, a voice recognition system, a gesture recognition system and other such systems. In the embodiment shown in FIG. 2, user controls 58 include a shutter trigger button 60. User 5 initiates image capture by depressing shutter trigger button 60. This causes a trigger signal to be transmitted to microprocessor 50. Microprocessor 50 receives the trigger signal and generates capture signals in response to the trigger signal that cause an image to be captured by one or both of the first image capture system 10 and the second image capture system 20.

In the embodiment shown in FIG. 3, user controls 58 also include a "wide" zoom lens button 62 and a "tele" zoom lens button 64, are provided which together control both a 2:1 optical zoom and a 2:1 digital zoom feature. The optical zoom is provided by taking lens unit 6, and adjusts the magnification in order to change the field of view of the focal plane image captured by image sensor 24. The digital zoom is provided by the digital signal processor 40, which crops and resamples the captured image stored in frame memory 38. When user 5 first turns on imaging system 4, the zoom lens is set to the 1:1 position, so that all sensor photoelements are used to provide the captured image, and the taking lens unit 6 is set to the wide angle position. In a preferred embodiment, this wide angle position is equivalent to a 40 mm lens on a 35 mm film camera. This corresponds to the maximum wide angle position.

When user 5 then depresses the "tele" zoom lens button 64, taking lens unit 6 is adjusted by microprocessor 50 via lens driver 30 to move taking lens unit 6 towards a more telephoto focal length. If user 5 continues to depress the "tele" zoom lens button 64, the taking lens unit 6 will move to the full optical 2:1 zoom position. In a preferred embodiment, this full telephoto position is equivalent to a 40 mm lens on a 35 mm film camera. If user 5 continues to depress the "tele" zoom lens button 64, the taking lens unit 6 will remain in the full optical 2:1 zoom position, and digital signal processor 40 will begin to provide digital zoom, by cropping (arid optionally resampling) a central area of the image. While this increases the apparent magnification of the second image capture system 20, it causes a decrease in sharpness, since some of the outer photoelements of the sensor are discarded when producing the archival image. However, this decrease in sharpness would normally not be visible on the relatively small viewfinder display 33 and exterior display 42.

For example, in the embodiment shown in FIG. 1, second image capture system 20 derives an evaluation image from a high resolution image sensor 24 having, for example, 2448×1632 photosensors corresponding to about 4.0 megapixels. The term resolution is used herein to indicate the number of picture elements used to represent the image. Exterior display 42, however, has lower resolution providing, for example, 320×240 elements, which correspond to about 0.08 megapixels. Thus, there are about 50 times more sensor elements than display elements. Accordingly, it is necessary to resample the initial image into an evaluation image having a suitably small image size so that it can properly fit on viewfinder display 33 or exterior display 42. This resampling can be done by using low pass filtering, followed by sub-sampling, or by using bilinear interpolation techniques with appropriate anti-aliasing conditioning. Other techniques known in the art for adapting a high resolution image for display on a relatively low resolution display can alternatively be used.

The resampling of the captured image to produce an evaluation image having fewer pixels (i.e. lower resolution) than the captured image is performed by digital signal processor 40. As noted earlier, digital signal processor 40 can also provide digital zooming. In the maximum 2:1 setting, digital signal processor 40 uses a central area such as an area comprising 640×480 photosites to form an image and interpolates the imaging information from these photosites to obtain an image having, for example, 1280×960 or 2448×1632 samples to provide the image.

Digital signal processor 40 can also modify the evaluation images in other ways so that the evaluation images match the appearance of a corresponding archival image when viewed on viewfinder display 33 or exterior display 42. These modifications include color calibrating the evaluation images so that when the evaluation images are presented on viewfinder display 33 or exterior display 42, the displayed colors of the evaluation image appear to match the colors in the corresponding archival image. These and other modifications help to provide user 5 with an accurate representation of the color, format, scene content and lighting conditions that will be present in a corresponding archival image.

As noted above, because evaluation images are displayed using an electronic display that has lower resolution than a corresponding archival image, an evaluation image may appear to be sharper when viewed through viewfinder display 33 or exterior display 42 than it will appear when the archival image is printed or otherwise displayed at higher resolution. Thus, in one optional embodiment of the present invention, each evaluation image can be modified so that areas that will appear out of focus in a corresponding archival image could appear to be out of focus when viewed on an electronic display such as exterior display 42. Moreover, when the digital zoom is active, the entire image is softened, but this softening would normally not be visible in exterior display 42. For the example in imaging system 4 of FIG. 1, exterior display 42 can be a display having 320×240 pixels while the archival image is provided using a sensor area of 640×480 pixels in the maximum digital zoom setting. Thus, the evaluation image displayed on exterior display 42 after normal resizing will appear suitably sharp. However, the archival image will not produce an acceptably sharp print. Therefore, a resampling technique can be used which creates an evaluation image having 320×240 pixels, but having reduced apparent sharpness when the maximum digital zoom setting is used, as is described in commonly assigned U.S. patent application Ser. No. 10/028,644 entitled "Method and Imaging system for Blurring Portions of a Verification Image To Show Out of Focus Areas in a Captured Archival Image", filed by Belz, et al. on Dec. 21, 2001.

It will be appreciated that the apparent sharpness of a print or other tangible output that is made from the archival image is also a function of the size of the rendered image. Accordingly, imaging system 4 can optionally have an input (not shown) for receiving a signal indicating the expected size of the output and can adjust the apparent sharpness of the evaluation image accordingly and/or provide a warning as is also described in the '644 application.

Micro-lens Array

As is noted above, the amount of light that is available to each of first image capture system 10 and second image capture system 20 during a capture time is effectively reduced because the light passing from the scene through taking lens unit 6 is shared between first image capture system 10 and second image capture system 20. This effectively reduces the effective sensitivity of first image capture system 10 and second image capture system 20. In accordance with the present invention, the effective sensitivity of at least one of first image capture system 10 and second image capture system 20 is enhanced by optically associating a micro-lens array 12 with at least one of the first image capture system 10 and the second image capture system 20. In the embodiment of FIG. 1, micro-lens array 12 is positioned between beam splitter 8 and second imaging surface 21. The function of micro-lens array 12 will now be described with reference to FIGS. 4 and 5.

Figure 4:
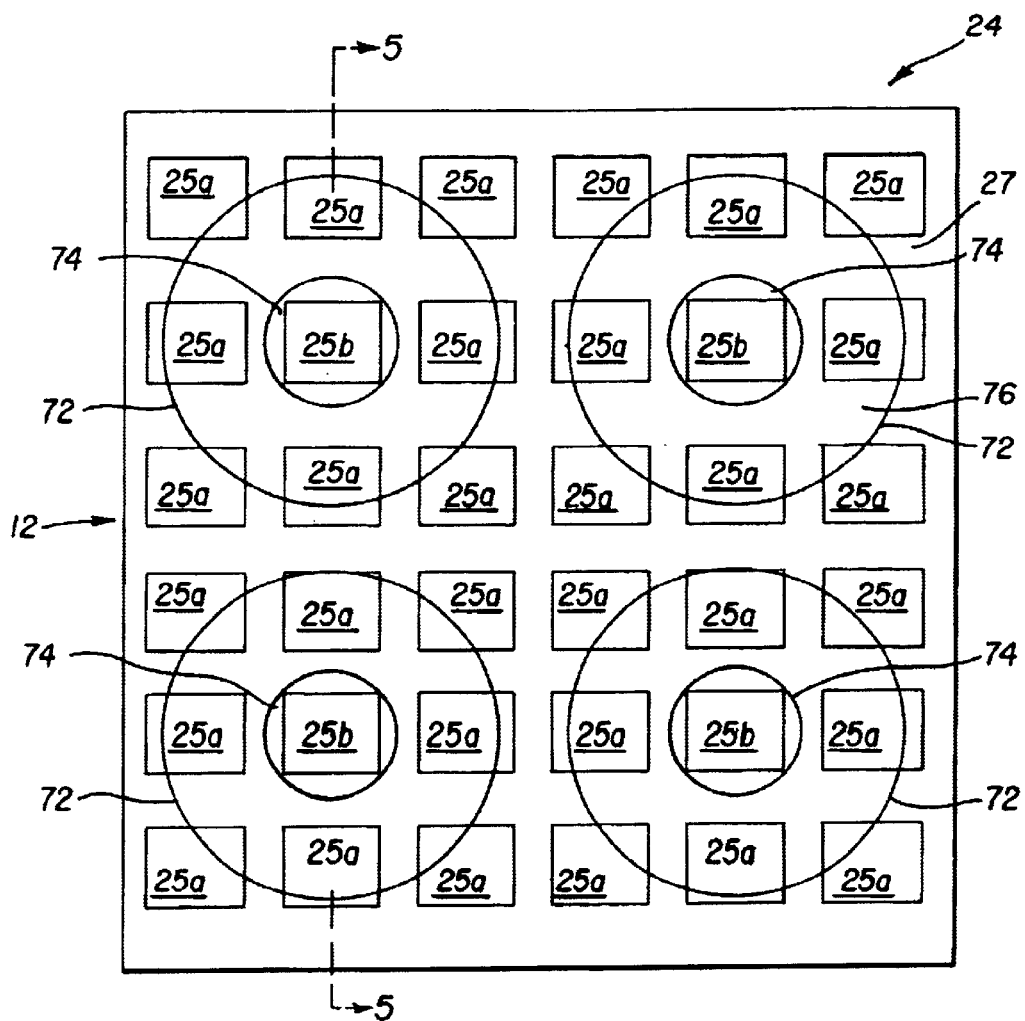
FIG. 4 is an illustration of one embodiment of a face view of an image sensor with an optically associated array of micro-lenses.

FIG. 4 schematically illustrates a face view of one embodiment of micro-lens array 12 and an associated image sensor 24 according to the invention. As is shown in FIG. 4, image sensor 24 has a second imaging surface 21 with photosensors 25, and light non-responsive inactive areas 27, such as isolation regimes, drains and interconnectivity regions. The projection of individual dynamic range enhancement micro-lenses 72 of micro-lens array 12 is shown relative to photosensors 25.

Figure 5:
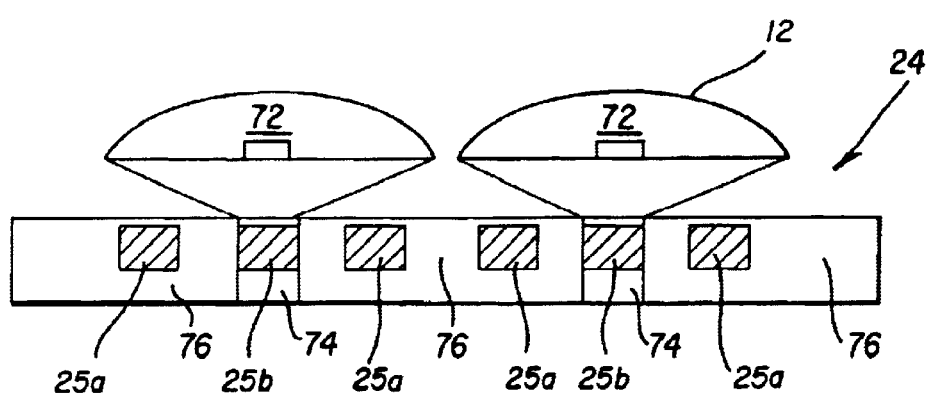
FIG. 5 is a side illustration of one embodiment of an image sensor and array of micro-lenses shown in FIG. 4.

FIG. 5 schematically illustrates a cross section view of the embodiment of FIG. 4. As is shown in FIG. 5, light from a scene striking each dynamic range enhancement micro-lens 72 is focused at an associated concentrated image area 74 of image sensor 24. At least one photosensor in a concentrated image area 25b is positioned within each concentrated image area 74 associated with each dynamic range enhancement micro-lens 72. Photosensors in a concentrated image area 25b within each concentrated image area 74 receive enhanced exposure thereby increasing the effective sensitivity of photosensors in a concentrated image area 25b within concentrated image area 74. This makes it possible to image dark scene elements such as scene shadows. Photosensors in a residual image area 25a that are outside of concentrated image area 74 are located in residual image area 76. Photosensors in a residual image area 25a receive a reduced exposure. This is because a portion of the light that would have traveled to photosensors 25a in residual image areas 76 is focused by each dynamic range enhancement micro-lens 72 onto concentrated image areas 74. This effectively filters the amount of light passing to photosensors 25a in residual image areas 76 reducing the effective sensitivity of photosensors 25a. Thus, each dynamic range enhancement micro-lens 72 concentrates light at concentrated image area 74 and enhances the exposure at photosensitive area 25b while retarding the exposure of residual image area 76 and reducing exposure at photosensitive area 25a.

Figure 6A:
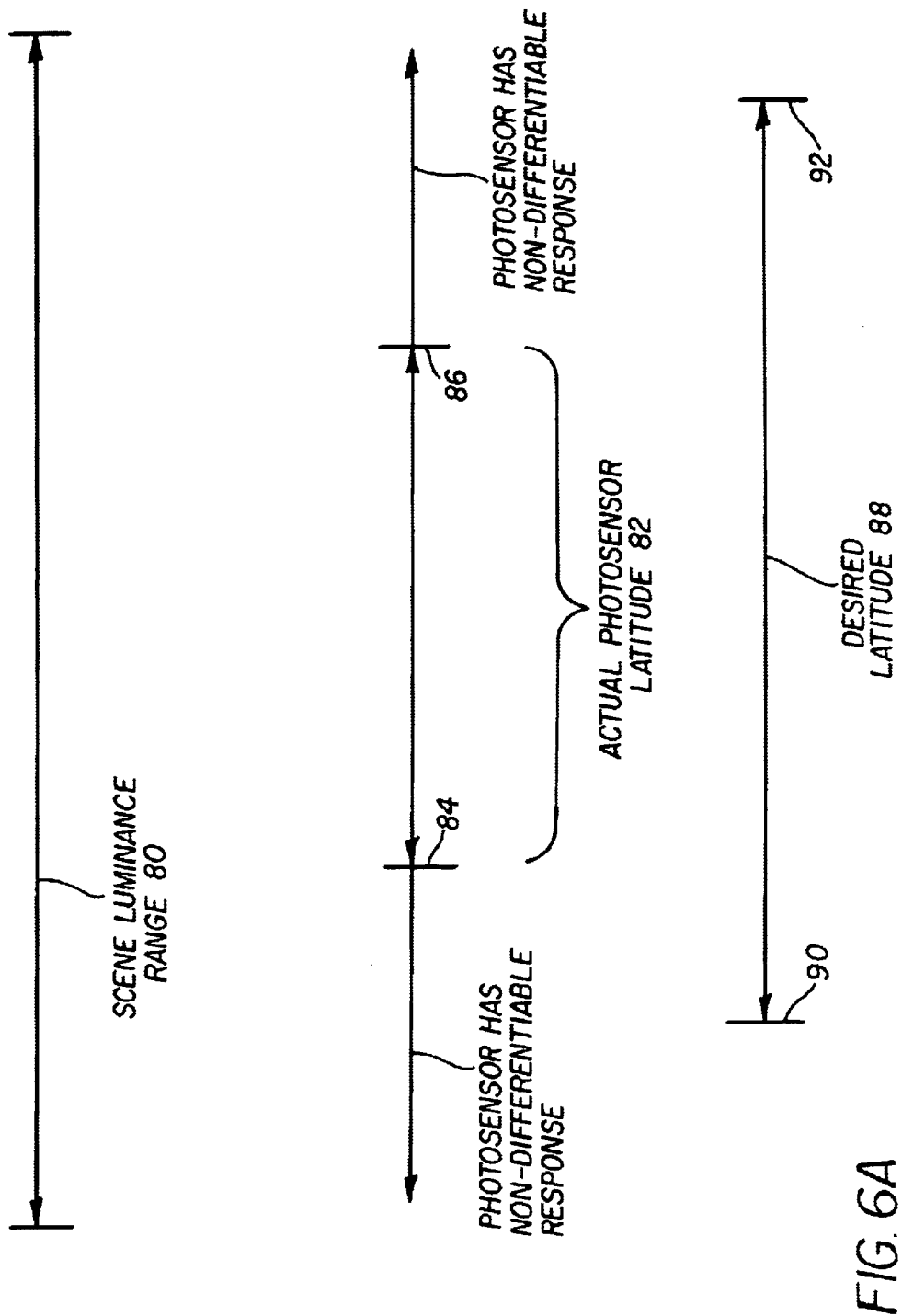
FIG. 6A is a diagram useful in describing the relationship between scene exposure, actual latitude and effective latitude.

The operation of this system can be explained with reference to FIGS. 6A, 6B and 6C. As is shown in FIG. 6A, light from a photographic scene extends over a wide range of scene luminances. In the case of consumer photography, these are typically the luminances that are visually observable by humans. This range is indicated in FIG. 6A as scene luminance range 80. However, photosensors 25 on image sensor 24 has an actual latitude 82 within which photosensors 25 can capture differences in scene illumination and record a contrast image of the scene. Because of the inherent limitations of solid-state image capture technology and the specific response of photosensors 25 to illumination from the scene, the actual photosensor latitude 82 of photosensors 25 is defined by a lower response threshold 84 and an upper response threshold 86. Photosensor 25 does not differentiably react to scene illumination differences when photosensor 25 is exposed to quantities of light that are lower than the lower response threshold 84. This is in part because the amount of charge stored at the photosensor 25 during an image capture sequence can be so low as to be indistinguishable from errant electrical interference or other noise that can become involved with signals transmitted from the imager. This effect practically occurs when the signal to noise ratio of the exposure matches the inherent dark signal to noise ratio of image sensor 24.

Similarly, photosensor 25 does not differentiably react to scene illumination differences when element 30 is exposed to quantities of light that are higher than the upper response threshold 86. As noted in greater detail above, this is because the amount of light received by photosensor 25 above upper response threshold 86 is sufficient fill the charge storage capacity of photosensor 25 of image sensor 24 so that photosensor 25 no longer has a meaningful additional response to additional light energy. Because of this, all photosensors 25 that are exposed to such quantities of light cease to record meaningful differences in scene content.

However, as is also shown in FIG. 6A, it is desirable that second image capture system 20 and image sensor 24 should record scene information at a desired system latitude 88 having desired system lower response threshold 90 that is lower than the lower response threshold 84 of photosensors 25 of image sensor 24. Photography in this range of illumination is made possible by concentrating light from the scene. In this regard, each of micro-lenses 72 in micro-lens array 12 fractures light from the scene into at least two portions. A concentrated fraction of light from the scene is concentrated so that a greater amount of light per unit area falls upon each of photosensors 25*b* within the concentrated image areas 74 during a capture time than would fall upon photosensors 25*b* within concentrated image areas 74 in the absence of the array of micro-lenses 12 of dynamic range enhancement micro-lenses 72.

Figure 6B:
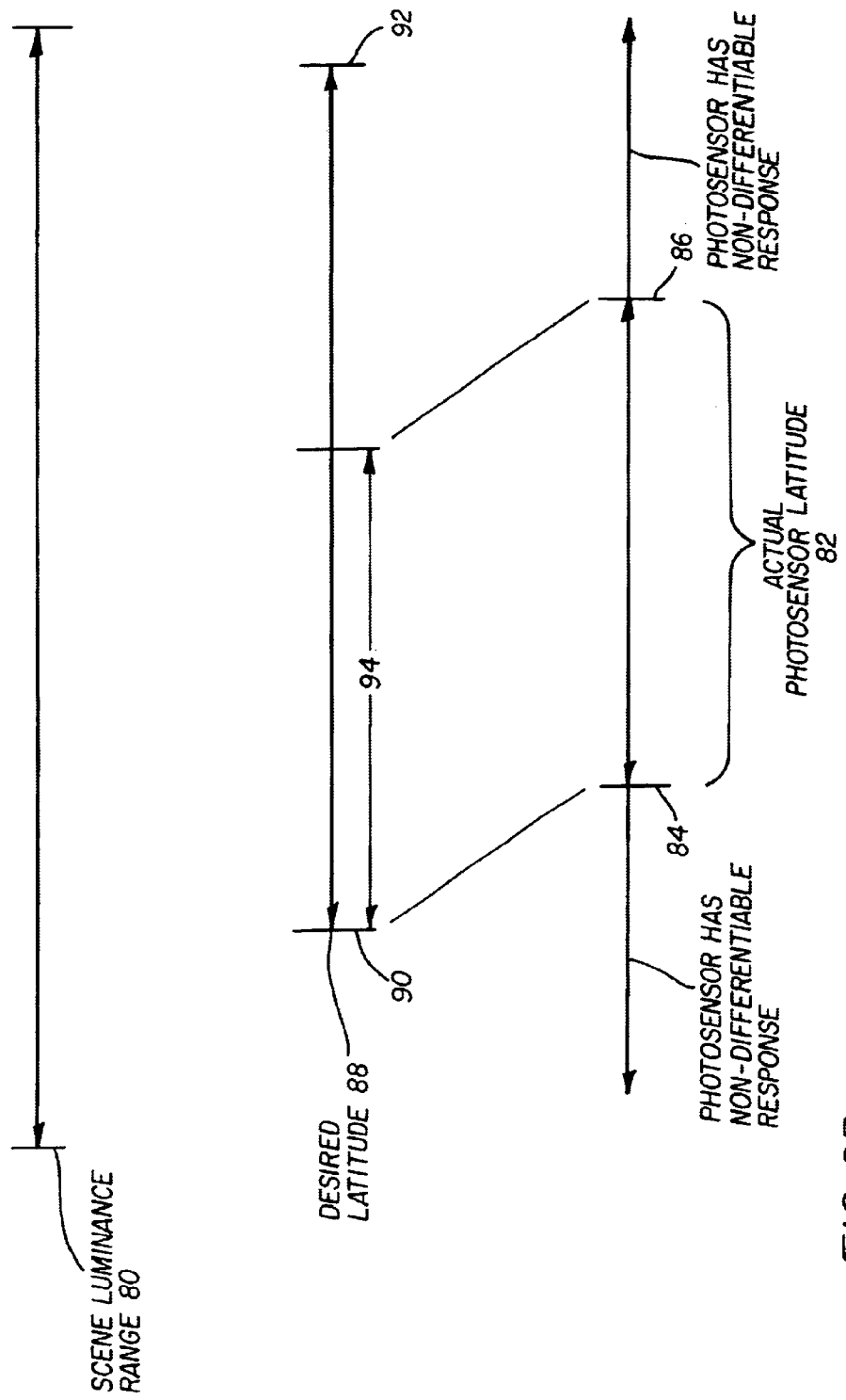
FIG. 6B is a diagram useful in describing the effect of concentrated light on a photosensitive element.

As is shown in FIG. 6B, this increase in the amount of light incident upon photosensors 25*b* within concentrated image areas 74 has the effect of shifting a first range of scene exposure levels 94 so that the entire first range 94 is within actual photosensor latitude 82 allowing photosensors 25*b* within concentrated image 74 record an image.

Figure 6C:
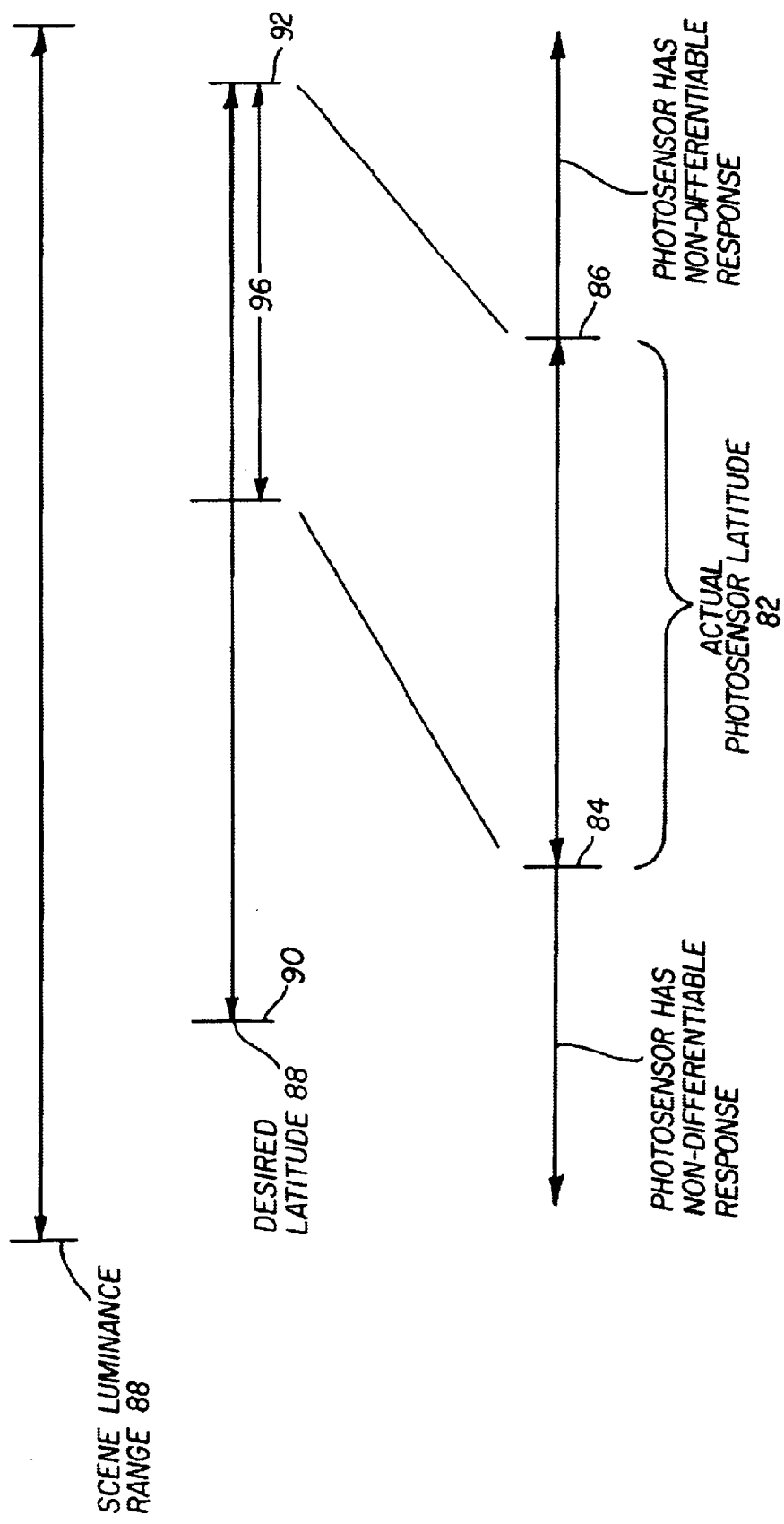
FIG. 6C is a diagram useful in describing the effect of residual light on the photosensitive element.

As is shown in FIG. 6C, some of the light incident on micro-lenses 72, for example light that is poorly focused by micro-lenses 72 or light that passes between distinct ones of micro-lenses 72, is not concentrated. Instead, this residual fraction of the light passes to image sensor 24 and is incident on photosensors 25*a* of residual image area 76 thus enabling formation of a residual image. The residual image can further be formed by designed or adventitious light scatter and reflection at image sensor 24 The residual fraction of light that strikes residual image area 76 during a second capture time is less than the amount of light that would be incident on residual image area 76 in the event that array 12 of micro-lenses 72 was not interposed between a scene and image sensor 24 during the same second capture time. Thus, micro-lenses 72 effectively filter light from the scene that is incident on residual image area 76 so that a greater quantity of light must be available during the second capture time in order for photosensors 25*a* of residual image area 76 to receive sufficient illumination to form an image. Accordingly, the second capture time used to obtain images from image sensor 24 is typically sufficient to form an image on the residual image area 76 of the image sensor 24 when light from the scene is within a second exposure range 96.

As is shown in FIG. 6C, when the micro-lenses 72 of micro-lens array 12 are exposed to light within second exposure range 96, a second exposure suitable for producing an image i.e. within the actual photosensor latitude 82 is formed on photosensors 25*a* in the residual image area 76. In this way, image sensor 24 can be used to record differentiable images at exposure levels that are above the upper response threshold 86 of photosensors 25 of image sensor 24 but below a desired system upper response threshold 92.

A region of overlap can be defined between first exposure range 94 and second range of scene exposure levels 96. Where it is desired to greatly increase system latitude 88, this region of overlap can be contracted. In one embodiment, the ability to capture image information from photosensors 25 within either concentrated image areas 74 or residual image areas 76 over a desired system latitude 88 is ensured by defining a substantial range of exposures wherein first exposure range 94 and second exposure range 96 overlap. Alternatively, it may be preferred to provide an imaging system 4 wherein there is substantial separation between first exposure range 94 and second exposure range 96. An imaging system 4 having such a substantial separation would effectively operate to capture different images under very different imaging conditions such as daylight and interior light.

As is shown in FIGS. 6*b* and 6*c*, micro-lens array 12 has a plurality of micro-lenses 72 each confronting more than one of photosensors 25. It will be appreciated that the fraction of photosensors 25*b* receiving micro-lens focussed light, to enable image capture in first range of scene exposure levels 94 and the other fraction receiving effectively filtering light, to enable image capture in second range of scene exposure levels 96light will influence the portion of the image that is shifted in exposure space as discussed in detail in relation to FIGS. 6A, 6B and 6C above. The ratio of exposure enhanced photosensors 25*b* to other photosensors 25*a* is related to the magnitude of the overall shifts in exposure space. This proportion will also influence the resolution and overall image structure capabilities in each exposure region.

In one embodiment, the ratio of the number of photosensors 25 to the number of micro-lenses 72 is at least 1.5 to 1. In another embodiment, the ratio can be at least 2 to 1. In further embodiments the ratio can be at least 5 to 1, and at least 9 to 1. Additionally, in one embodiment the ratio of the number of photosensors 25 to the number of micro-lenses 72 can be no greater than 1000 to 1. In another embodiment, this ratio is no greater than 100 to 1. In still another embodiment, this ratio can be no greater than 5 to 1. Further, the structure of micro-lens array 12 and the dimensions of micro-lens 72 relative to the layout of image sensor 24 can be such that the exposure of some individual photosensor sites 25 are not influenced by micro-lenses 72. This embodiment provides a proportion of photosensors 25 that are not shifted in exposure space, thereby preserving latitude 82. In a useful embodiment, the fraction of photosensors 25*b* positioned to receive focused light on exposure and the fraction of other photosensors 25*b* positioned to receive residual light on exposure constitute at least 25% of photosensors 25 on image sensor 24. In a preferred embodiment, the fraction of photosensors 25*b* positioned to receive focused light on exposure and the fraction of photosensors 25*a* positioned to receive residual light on exposure constitute at least 50% of photosensors 25 on image sensor 24. While in another embodiment, the fraction of photosensors 25*b* positioned to receive focused light on exposure and the fraction of other photosensors 25*a* positioned to receive residual light on exposure constitute at least 75% of all the photosensors.

It will be appreciated that when an exposure level is in second exposure range 96 and the first exposure range 94 and second exposure range 96 at least partially overlap, photosensors 25*b* may also contain useful imaging information. Under these circumstances image information can be obtained from photosensors 25b. However, where the exposure is above the first exposure range 94 then photosensors 25b in concentrated image areas 74 will be fully exposed and will not contain any differentiable image information.

It will be further appreciated that while this discussion has been framed in terms of a specific embodiment directed towards image capture intended for capturing human visible scenes, the invention can be readily applied to capture extended scene luminance ranges and spectral regions invisible to humans and the solid state image sensor can be any solid state image known to the art that has the requisite imaging characteristics. The effective increase in latitude enabled can be at least 0.15 log E. In certain embodiments, the effective increase in latitude can be between at least 0.3 log E and 0.6 log E. In other embodiments, the effective increase in latitude is at least 0.9 log E.

Figure 7A:
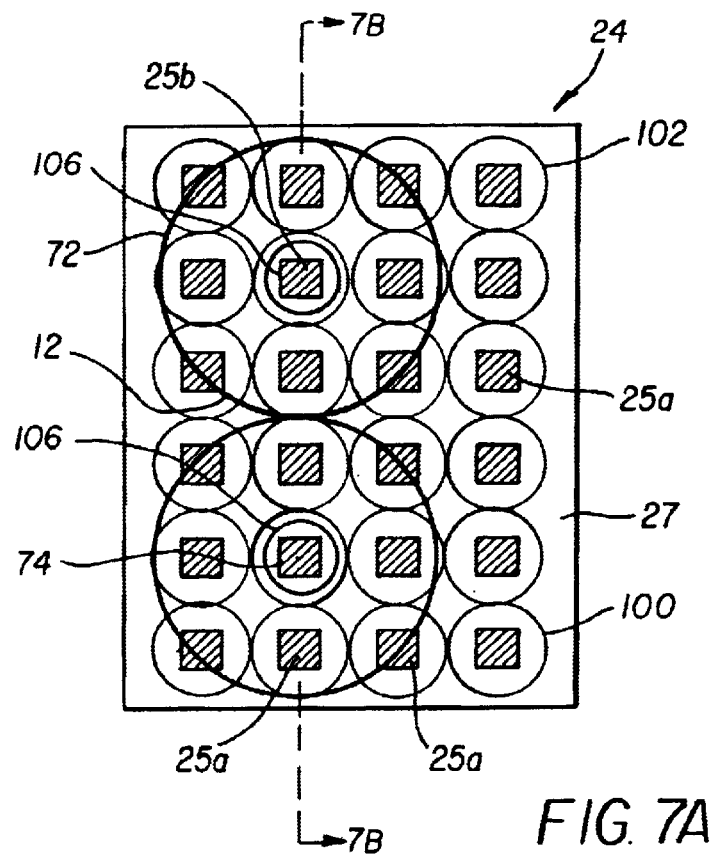
FIG. 7A schematically illustrates a face view of another embodiment of an image sensor with an optically associated array of micro-lenses of the invention.

FIG. 7A schematically illustrates a face view of another embodiment of a micro-lens array 12 and an associated image sensor 24 is shown. Here an array 100 of sensitivity enhancing micro-lenses 102 is provided to reduce the amount of light that is allowed to strike light inactive areas 27. Array 100 positions each sensitivity enhances micro-lens 102 in association with one photosensor 25. The optional array 100 is known in the art.

Figure 7B:
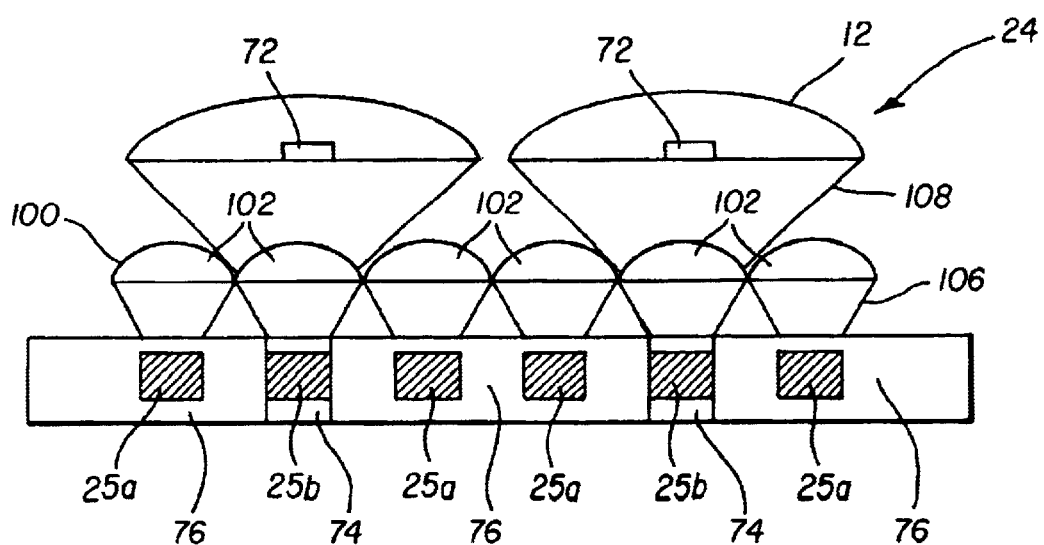
FIG. 7B schematically illustrates a side view of the embodiment of FIG. 7A.

As can be seen in this embodiment, sensor 24 comprises both a micro-lens array 12 of dynamic range enhancement micro-lenses 72 and an array 100 of sensitivity enhancing micro-lenses 102 as described in U.S. Pat. No. 4,667,092 entitled Solid-State Image Device With Resin Lens and Resin Contact Layer filed by Ishihara on Dec. 22, 1993. FIG. 7B schematically illustrates a side view of the embodiment of FIG. 7A. As is shown in FIGS. 7A and 7B sensitivity enhancing micro-lenses 102 enhance the response of each photosensors 25 by concentrating light 106 at the individual photosensors 25. The larger micro-lenses 72, however, act to concentrate light 108 at specific ones of the sensitivity enhancing micro-lenses 102 and associated photosensors 25b, in concentrated image area 74 while allowing residual light to fall onto other ones of the micro-lenses 102 and associated photosensors 25a, in residual image areas 76 thereby increasing the luminance range recording capability of image sensor 24. Thus, in this embodiment, the sensitivity of all photosensors 25 is enhanced by micro-lenses 102 while micro-lens array 12 of micro-lenses 72 enhances the effective sensitivity of selected photosensors 25b and reduces the effective sensitivity of other photosensors 25a. Digital signal processor 40 can form images using image information from photosensors 25b, so that second image capture system 20 can achieve a greater effective sensitivity, than second image capture system 20 will have using image information from photosensors 25 having their sensitivity enhanced only by a sensitivity enhanced array 100 of micro-lenses 102. Digital signal processor 40 can also form images using image information from both photosensors 25a and 25b to achieve a greater effective dynamic range.

Figure 8D:
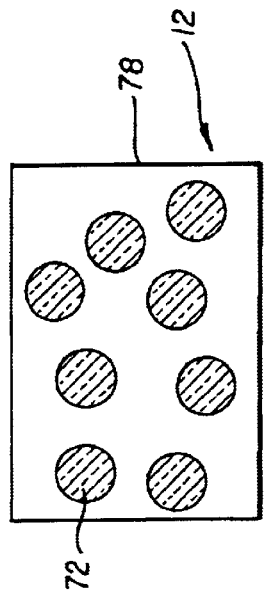
FIGS. 8A–8E show various diagrams illustrating embodiments of an array of micro-lenses useful in practicing the present invention.
Figure 8E:
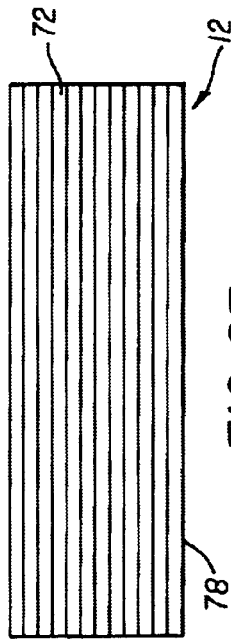
Figure 8A:
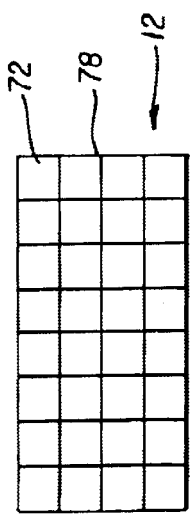
Figure 8B:
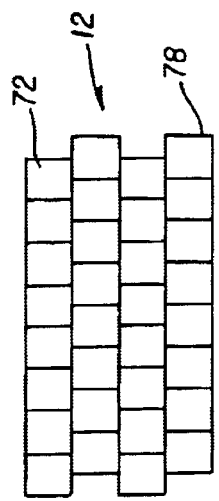
Figure 8C:
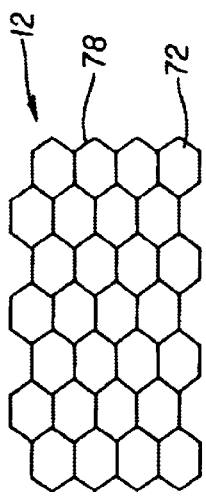

In the embodiments described above, micro-lens array 12 has been shown as comprising a cubic, close packed arrangement of circular dynamic range enhancement micro-lenses 72. This arrangement results in the concentration of light in the manner described above. In this embodiment, micro-lenses 72 can have a uniform cross-sectional area. FIG. 8A shows, conceptually, micro-lens array 12 of micro-lenses 72 arranged in this uniform cubic close packed distribution pattern by a support 78. It will be appreciated that other array patterns can be used. For example, FIG. 8B shows an embodiment of micro-lens array 12 having an off-set square close packed array pattern. In another embodiment shown in FIG. 8C dynamic range enhancement micro-lenses 72 are arranged in a micro-lens array 12 having a hexagonal close packed array pattern. Micro-lens array 12 can also feature random distributions of dynamic range enhancement micro-lenses 72. One embodiment of an array having a random distribution is shown in FIG. 8D. As is shown in FIG. 8E, in still another embodiment, array 12 can comprise an array of cylindrical or acylindrical dynamic range enhancement micro-lenses 72.

Figure 9A:
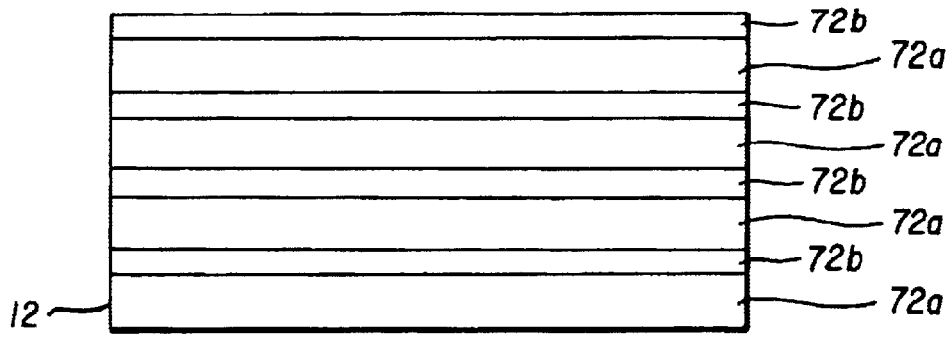
FIGS. 9A–9C show diagrams illustrating various embodiments of arrays of different micro-lenses that can be usefully combined in a single array of micro-lenses.
Figure 9B:
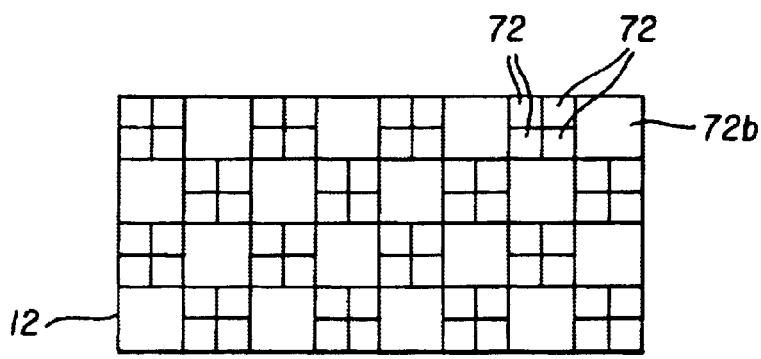
Figure 9C:
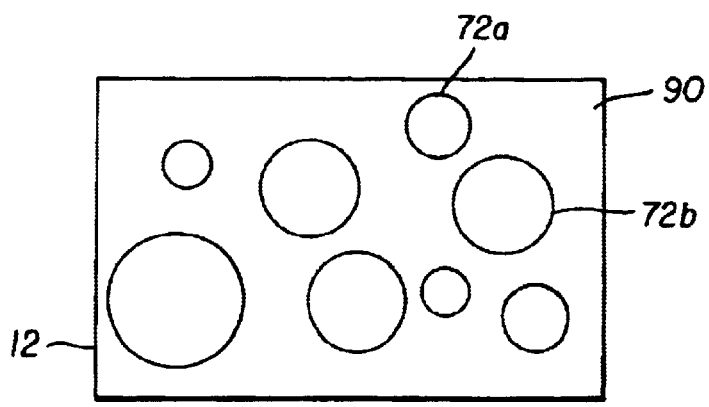
Figure 9D:
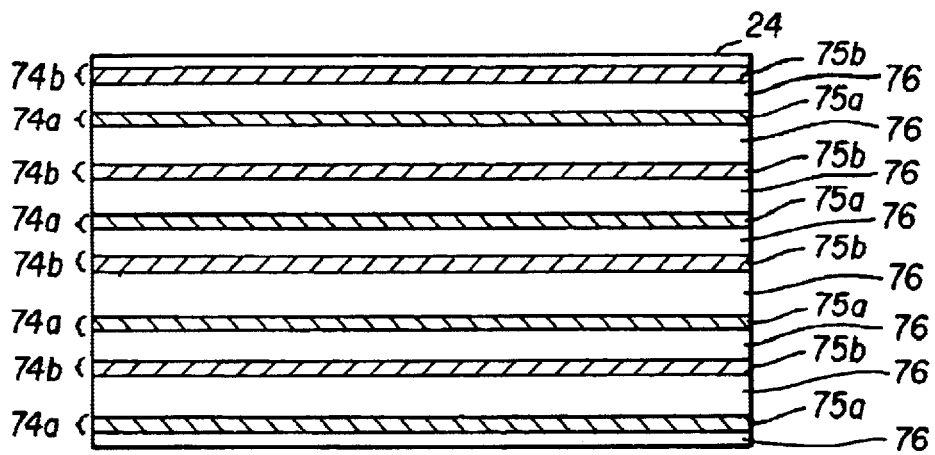
FIGS. 9D–9F show diagrams illustrating patterns formed on an image sensor by imagewise exposure of the image sensor to light from a scene passing through, respectively, the arrays of FIGS. 9A–9C.
Figure 9E:
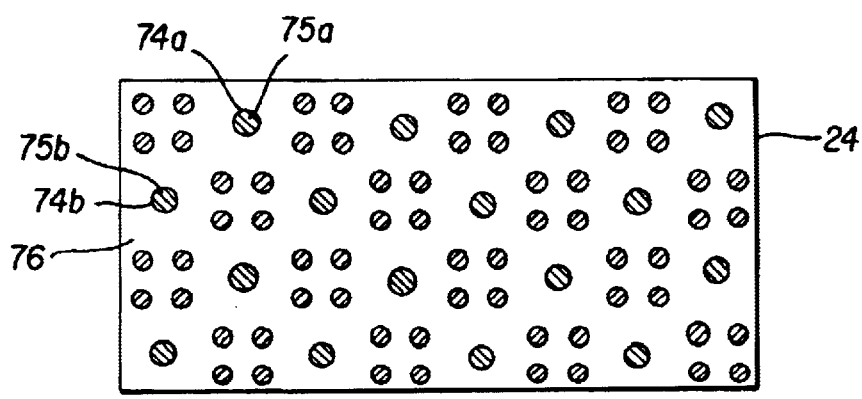
Figure 9F:
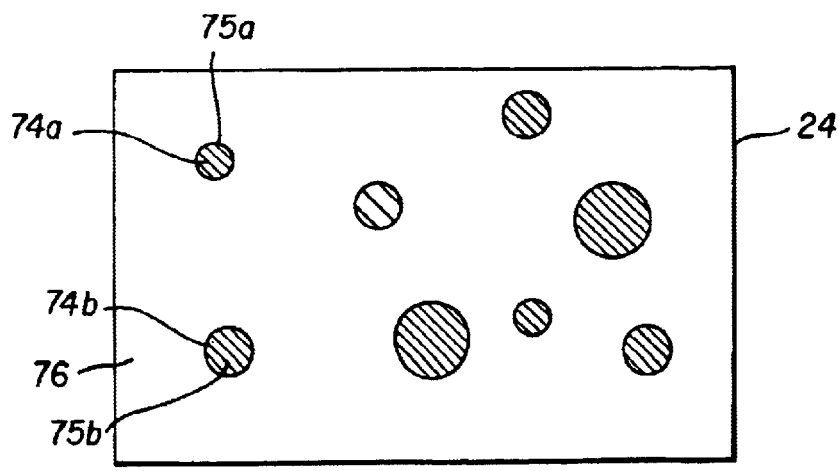

As is shown in FIGS. 9A, 9B and 9C, micro-lens array 12 can comprise dynamic range enhancement micro-lenses 72 having different optical characteristics. In the embodiment of FIG. 9A, micro-lens array 12 of cylindrical dynamic range enhancement micro-lenses 72 is shown. As is shown in FIG. 9A, micro-lens array 12 has a first set of micro-lenses 72a that have a greater cross-section area than a second set of micro-lenses 72b also provided by micro-lens array 12. In this embodiment, the first set of micro-lenses 72a concentrate a greater portion of light during an exposure than micro-lenses 72b. Thus, the first set of micro-lenses 72a form a line image exposure 75a on image sensor 24 as shown in FIG. 9D, in a first set of concentrated image areas 74, when the amount of the light during the exposure is within a first exposure range 84. When light from the scene is within a second exposure range 86, the second set of micro-lenses 72b form a line image exposure 75b on image sensor 24 in a second set of concentrated image areas 74b. Light that is not concentrated by either set of micro-lenses 72a and 72b can form a residual image (not shown) in residual image area 76 of image sensor 24 of FIG. 9D. Similarly, FIGS. 9B and 9C each show the use of a micro-lens array 12 having differently sized sets of first set of micro-lenses 72a and second set of micro-lenses 72b with micro-lens array 12 concentrating light and directing that light onto concentrated image areas 74a to form line image exposure 75a when light from the scene is within a first range. Micro-lenses 72b concentrate light from a scene and direct this light onto concentrated image areas 74b to form a line image exposure 75b when the light from the scene is within a second range. Here too, residual portions of the light are recorded in residual image areas 76. Thus, in these embodiments of FIGS. 9A–9C the effective latitude of image sensor 24 can be further extended.

As is shown in FIG. 9C, the surface coverage of micro-lenses 72 does not have to be maximized. While any useful surface coverage of micro-lenses 72 can be employed, the ratio of the projected area of micro-lenses 72 to area of image sensor 24 occupied by the photosensors 25 can be at least 5 percent.

In one embodiment, the coverage can be between at least 50 percent and up to 85 percent. In another embodiment, surface coverage of 85 percent up to the close-packed limit can be used. The precise degree of surface coverage can be adjusted to enable varying levels of exposure latitude while maintaining useful image quality. In any embodiment where the surface coverage is less than the close packed limit, support 78 can be defined to allow residual light to pass to image sensor 24.

It will be appreciated that the concentration of light by micro-lens array 12 of dynamic range enhancement micro-lenses 72 also performs the optical equivalent of re-sampling the image formed on an imaging surface such as second imaging surface 21 of second image capture system 20. Accordingly, in one useful embodiment of the present invention, the surface coverage of micro-lens array 12 can be matched to correspond to the imaging resolution of a display such as viewfinder display 33 or exterior display 42 in imaging system 4 and micro-lens array 12 can be placed in optical association with imaging surface 21 such as on image sensor 24. Where this is done, an evaluation image can be extracted from image sensor 24 at an image resolution appropriate for display simply by scanning extracted image data from the image sensor and assembling image information only from the concentrated image areas. This speeds image processing by eliminating the need for digital signal processor 40 to perform the step of resampling an initial image so that an evaluation image can be provided more quickly. Further, micro-lens array 12 can be used to direct concentrated light onto particular sections of image sensor 24. This permits image sensor 24 to have photosensors 25 that are inoperative to be used to capture evaluation images in that micro-lenses can be used to concentrate light away from inoperative photosensors and onto adjacent operative photosensors without impairing image quality. Accordingly, lower cost imagers can be used.

It will also be appreciated that the dynamic range of an imaging surface such as first imaging surface 11 can vary during operation of the imaging system. For example, in the embodiment of FIG. 1 first imaging surface 11 is located on photosensitive element 14 which can, for example, comprise a film. Where different films are loaded into first image capture system 10, the sensitivity of the films can vary as is indicated by speed ratings for the films. The micro-lens array 12 can be provided with different types of micro-lenses 72 adapted to concentrate light in different intensities to form separate concentrated and residual images on an imaging surface. These different types of micro-lenses can be adapted to record images on second imaging surface 21 that generally correspond to the dynamic ranges of various types of films that can be located in an imaging system or that coincide with, for example 60% of the dynamic range of the films. In this way, when microprocessor 50 determines that a photosensitive element in imaging system 4 is rated at one speed, microprocessor 50 can cause digital signal processor 40 to extract an image using photosensors formed by micro-lenses that concentrate light in a way that is intended to provide a dynamic range that corresponds to the dynamic range of a photosensitive element 14.

Micro-lens array 12 can comprise a set of individual micro-lenses 72 that are formed together or joined together, for example by extrusion, injection molding and other conventional fabrication techniques known to those in the art. Micro-lens array 12 can also be formed by combining a plurality of separate micro-lenses 72 fixed together by mechanical or chemical means or by mounting on support 78. Micro-lens array 12 can comprise a set of lenticular beads or spheres (not shown) that are positioned proximate to or coated onto image sensor 24 or otherwise joined to image sensor 24. Micro-lenses 72 may be formed in any matter known in the microstructure art. Micro-lenses 72 may be unitary with image sensor 24, as for example by being embossed directly into image sensor 24 at manufacture or they may be integral to a distinct layer applied to image sensor 24. In still other embodiments, a micro-lens array 12 can be formed using a photosensitive coating.

The dimensions of imaging system 4 and the detailed characteristics of the taking lens unit 6 dictate the exposure pupil to image distance, i.e. the camera focal length. Preferably, an image is formed at the array of micro-lenses 12. The characteristics of micro-lenses 72 dictate their focal length. The micro-lens images are formed at the light sensitive areas of image sensor 24. The f-number of taking lens unit 6 controls the depth-of-focus and depth-of-field of imaging system 4 while the micro-lens f-number controls the effective aperture of imaging system 4. By using taking lens unit 6 having a stopped down f-number, excellent sharpness along with wide depth of focus and depth of field are obtained. By using an opened f-number for micro-lens array 72, high system speed is obtained.

Accordingly, a useful combination of taking lens unit 6 and micro-lenses 72 f-numbers will be those that enable system speed gains. System speed gains of more than 0.15 log E, or ½-stop, are useful, while system speed gains 0.5 log E or more are preferred. While any micro-lenses 72 having an f-number that enables a speed gain with taking lens unit 6 having adequate depth-of-field for an intended purpose can be gainfully employed, typically micro-lenses 72 having f-numbers of 1.5 to 16 are useful. In certain embodiments, micro-lenses 72 having f-numbers in the range of f/2 to f/7 are useful. In other embodiments, micro-lenses 72 having f-numbers in the range of f/3 to f/6 are preferred.

The individual micro-lenses 72 are convergent lenses in that they are shaped so as to cause light to converge or be focused. As such, they form convex projections from the support 78. The individual projections are shaped as portions of perfect or imperfect spheres. Accordingly, micro-lenses 72 can be spherical portion lenses or they can be aspherical portion lenses. Both types of micro-lenses can be simultaneously employed. A spherical portion micro-lens 72 has the shape and cross-section of a portion of a sphere. An aspherical portion micro-lens 72 has a shape and cross-section of a flattened or elongated sphere. The lenses are micro in the sense that they have a circular or nearly circular projection. Any useful lens diameter consistent with the operation of the invention as described and the dimensions of known solid state imager arrays can be usefully employed. In one embodiment, micro-lenses 72 with a diameter of between 1 and 1000 microns are used. A cylindrical portion micro-lens 72 has the shape and cross-section of a portion of a cylinder. An acylindrical portion micro-lens 72 has a shape and cross-section of a flattened or elongated cylinder. FIGS. 10A–10D show a cross-sectional view of micro-lenses 72 mounted in a support 78 and exhibiting example embodiments of various spherical and aspherical micro-lenses 72.

Figure 10A:
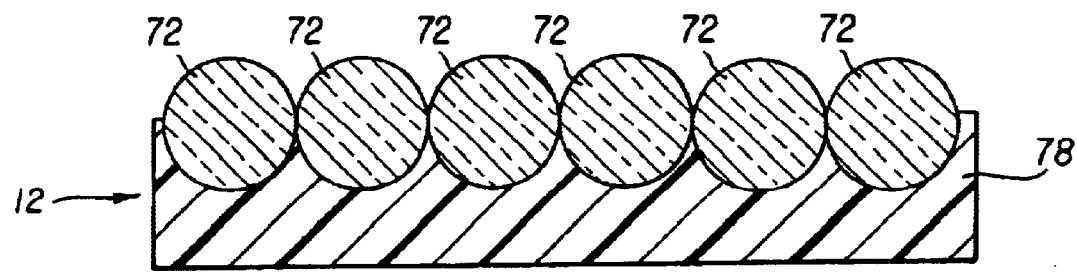
FIGS. 10A–10C show cross-section illustrations of arrays of micro-lenses, spherical and aspherical lenses.
Figure 10B:
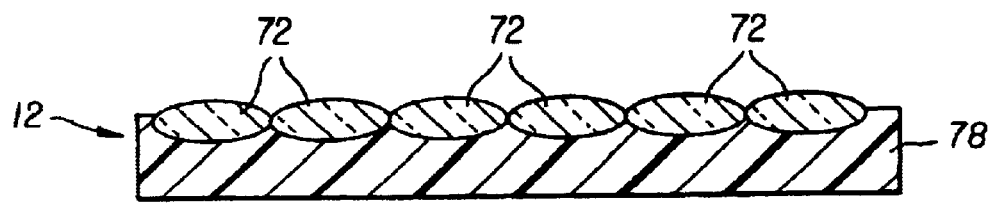
Figure 10C:
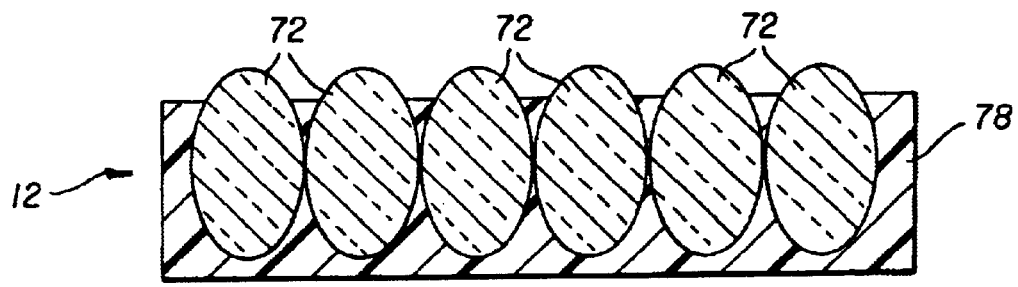

FIG. 10A shows an embodiment wherein micro-lenses 72 comprise spherical lenses joined by support 78. FIGS. 10B and 10C show embodiments of micro-lens array 12 having aspherical micro-lenses 72. It is appreciated that any of the above described array patterns may be combined with aspherical micro-lenses 72 to provide extended latitude. Further, any of the patterns of micro-lenses 72 can be applied in a non-close packed manner to enable extended photographic latitude.

Micro-lenses 72 are shown with distinct hatching to illustrate the spherical and aspherical character of the protruding portion that actually forms the micro-lens. Aspherical micro-lenses 72, of the type shown in FIGS. 10B and 10C, are especially useful for this application in that the variable radius of such lenses allows for control of the lens focal length and lens aperture nearly independently of the spacing between micro-lenses 72 and photosensors 25. While these cross-sections have been described as spherical or aspherical, it is fully appreciated that the diagrams equally represent in cross-section cylindrical or acylindrical micro-lenses 72.

The light concentration or useful photographic speed gain on concentrating light focused by taking lens unit 6 with a circular projection micro-lens 72 is the square of the ratio f-numbers of imaging system 4 and the micro-lenses 72. Speed gain (in log relative Exposure) in such a system can be determined as the speed gain equals 2×log (camera lens f-numbers/micro-lens f-numbers). The light concentration or useful photographic speed gain of cylindrical micro-lenses 72 allow the square root of such an improvement because they concentrate light in only one direction. The concentration of light by micro-lens array 12 enables both a system speed gain and forms an exposure pattern image sensor 24.

Preferred design parameters for micro-lenses 72 and their relationship to photosensors 25 of image sensor 24 follow from these definitions:

Micro-lens radius is the radius of curvature of the hemispheric protrusion of micro-lenses 72. For aspherical micro-lenses 72 this value varies across the surface of the micro-lens.

Micro-lens aperture is the cross sectional area formed by the micro-lens typically described as a diameter. For spherical micro-lenses this diameter is perforce less than or equal to twice the micro-lens radius. For aspherical micro-lenses this diameter can be greater than twice the smallest radius encountered in the micro-lens. Use of differently sized micro-lenses having distinct apertures enables distinct levels of speed gain on a micro-scale and thus enables extended exposure latitude for a photosensitive site.

Micro-lens focal length is the distance from micro-lenses 72 to photosensors 25 of image sensor 24.

Micro-lens f-number is the micro-lenses 72 aperture divided by the micro-lens focal-length. For spherical micro-lenses 72, the desired micro-lens focal length can be used to define an appropriate micro-lens radius following a lens equation, thusly:

Micro-lens radius is the micro-lens focal-length times $(n_2-n_1)/n_2$; where $n_1$ is the refractive index of the material outside the micro-lens (typically air with a refractive index of unity) while $n_2$ is the refractive index of the micro-lens and any contiguous transmissive material e.g. (plastics as used in array support 78.) The useful plastics or polymers typically have a refractive index of 1.4 to 1.7). The ratio of the highest to the lowest refractive index can be between 0.8 and 1.2. In preferred embodiments the ratio is between 0.95 and 1.05. Following the known refractive indices of typical photographic system components, useful spherical micro-lenses will have a micro-lens focal length about 3 times the micro-lens radius $((n_2-n_1)/n_2 \sim \frac{1}{3})$. Non-integral micro-lenses 72 can be made from a wider variety of plastics and glasses. For micro-lenses 72 that are integrally formed on image sensor 24, superior optical properties are provided when the refractive index of the materials used to form the composite optical device are as similar as possible.

Figure 11:
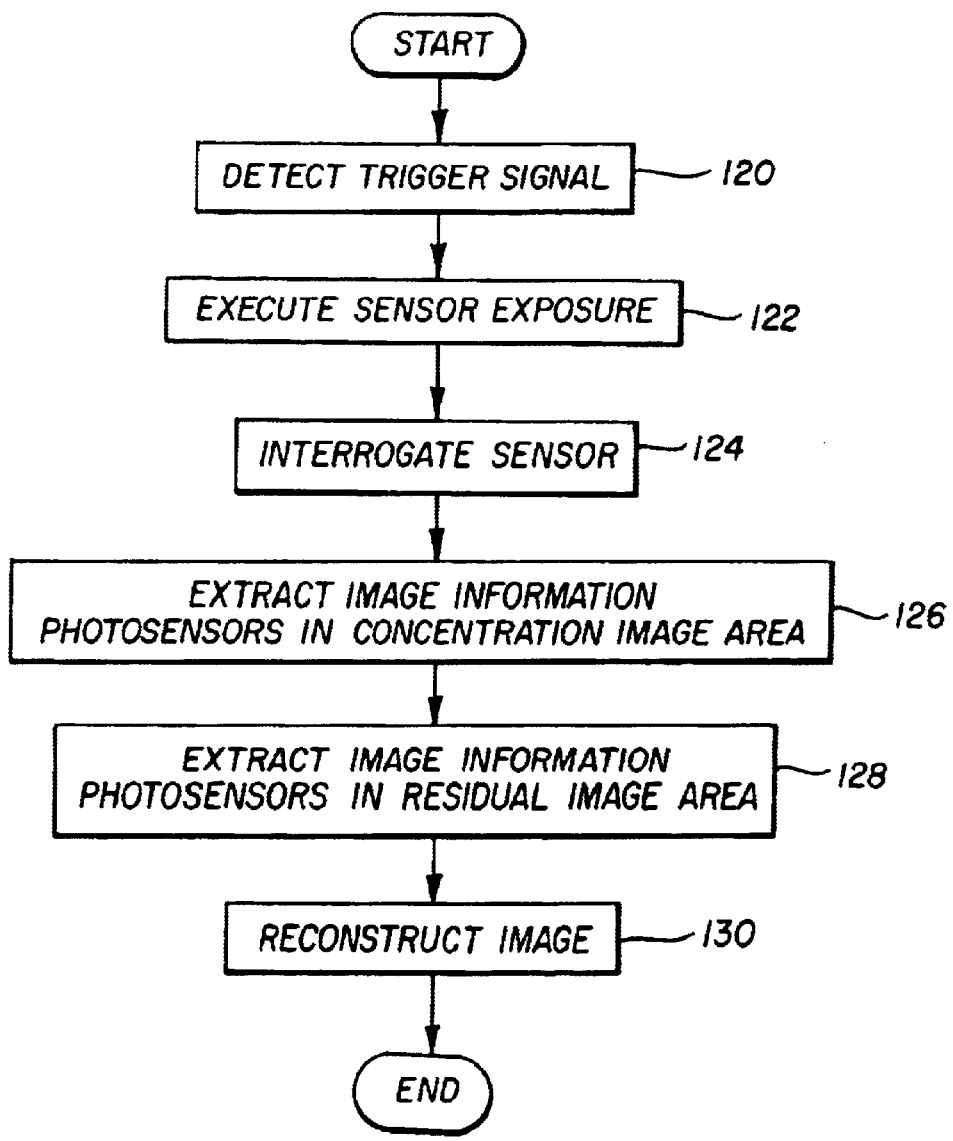
FIG. 11 shows a flow chart of imaging according to the invention.

FIG. 11 shows a flow chart of a method for capturing an image according to the invention. As is shown in FIG. 11, the process begins when a shutter trigger button 60 is depressed by user 5 causing a trigger signal to be generated (step 120). Microprocessor 50 detects the trigger signal indicating that shutter trigger button 60 has been depressed and causes first image capture system 10 and second image capture system 20 to capture images. A sensor exposure step is executed (step 122) using second imaging system 20 and image sensor 24 as described above. The array of micro-lenses 12 reduces range enhancing of scene information into concentrated image areas 74 and residual image area 76. Sensor 124 is interrogated (step 124) to capture and fix the exposure information. In this embodiment, image information is extracted from photosensors 25b within the concentrated image areas 47 (step 126). Image information is also extracted from the photosensors 25a in the residual image area 76 (step 128). The extracted image information is reconstructed (step 130) to form a likeness of the original scene.

Under low exposure conditions, scene information is determined based upon image conditions in the photosensors 25b in concentrated image area 74. In one embodiment, photosensors 25b in concentrated image area 74 are separated from photosensors 25a in residual image area 76 during a calibration process so that digital image processor 40 can quickly and efficiently separate image information obtained from concentrated image area 74 and residual image area 76. Alternatively, a single image can be obtained from image sensor 24 and processed by digital signal processor 40 which then uses image analysis techniques to separate image information obtained from concentrated image area 74 and image information obtained from residual image area 76.

Figure 12:
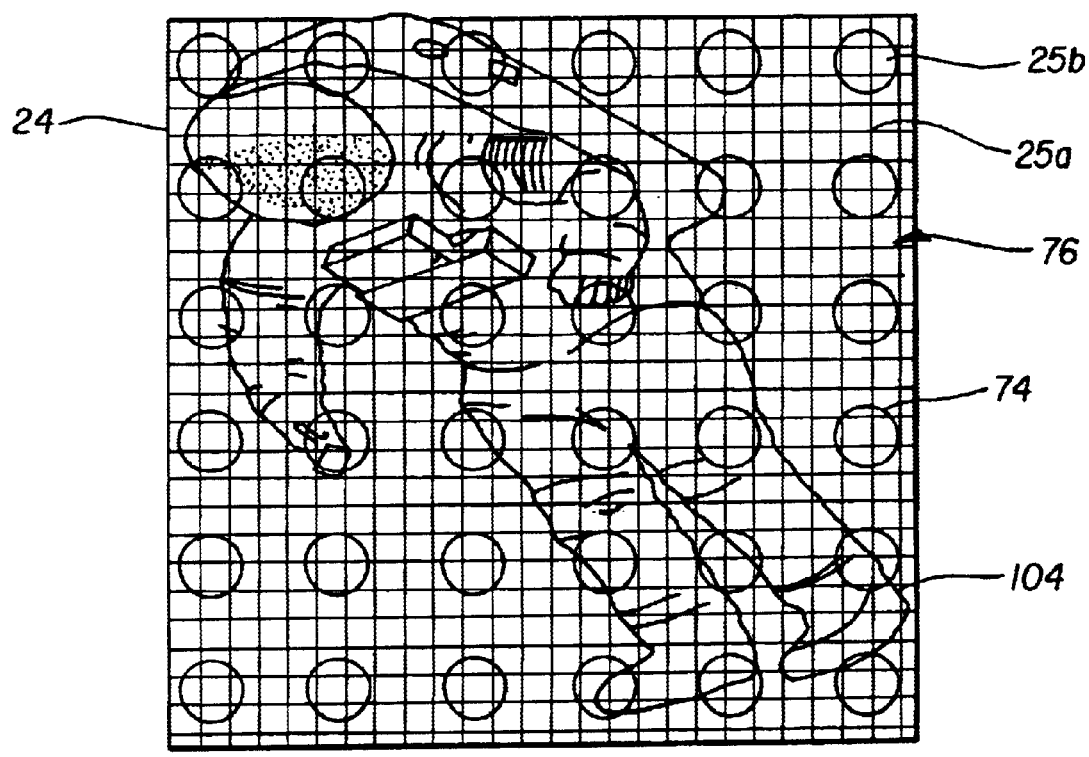
FIG. 12 shows a contrast pattern formed on an image sensor after imagewise exposure of the image sensor.

Under high exposure conditions, scene information is carried in photosensors 25a in residual image areas 76. FIG. 12 shows a contrast pattern image formed on image sensor 24 after image wise exposure of image sensor 24 to light from a scene that is within a first range of scene exposure levels 94. As is discussed above, when imaging system 4 is exposed to first range of exposure levels 94 image information is directly recorded by photosensors 25a in residual image areas 76 in the form of a residual image 104. Residual image 104 is similar to the image formed by conventional optical imaging techniques. However, as is shown in FIG. 12, residual image 104 is not a continuous image in that imaging information useful in the composition of residual image 104 is lost during the concentration of light onto photosensors 25b. There are various methods by which this information can be corrected. For example, interpolation techniques can be used to compensate for the missing information. In certain applications, under sampling techniques can be used to process imaging information captured by photosensors 25a.

Alternatively, where exposure conditions in the scene overlap, scene information can be obtained from photosensors 25a and 25b. Further, it will be appreciated that exposure conditions can vary within an image and, therefore, where a scene contains a wide range of exposure levels, it can occur that the exposure level in one portion of the image will be within the first exposure range 94 while the exposure level in the second portion of the same image will be in the second exposure range 96. Thus, in such an image, part of the image information will be obtained from photosensors 25b in the concentrated image areas 74 while another part of the image information will be obtained from photosensors 25a in residual image areas 76. Where this occurs, a single output image is composed by assembling the output image using image information for both concentrated image areas 72 and residual image areas 74 An image formed in this manner will contain imaging information representative of a scene exposure over a dynamic range that includes the entire desired system latitude 88.

It is appreciated that the forgoing discussion is couched in terms specific to system sensitivity enhancement enabled by the use of micro-lens array 12 as applied to image sensors such as solid state sensors. Although the underlying mechanistic considerations are somewhat distinct, similar considerations apply to sensitivity enhancement enabled by the use of intervening micro-lens array 12 as can be applied to photosensitive elements 14 such as photosensitive silver halide films. With silver halide films, the lower response threshold is set by consideration of the minimal applied photon flux required to make a silver halide grain developable, while the upper response threshold is set by either exhaustion of the density forming ability of the film or by full exposure of individual incorporated silver halide grains. When a photosensitive element 14 is optically associated with micro-lens array 12, image formation is accomplished by a photoprocessing development step with optional desilvering and stabilizing as known in the art followed by direct optical printing or scanning and digitization using techniques described in the commonly assigned and cross-referenced patent applications.

Figure 13:
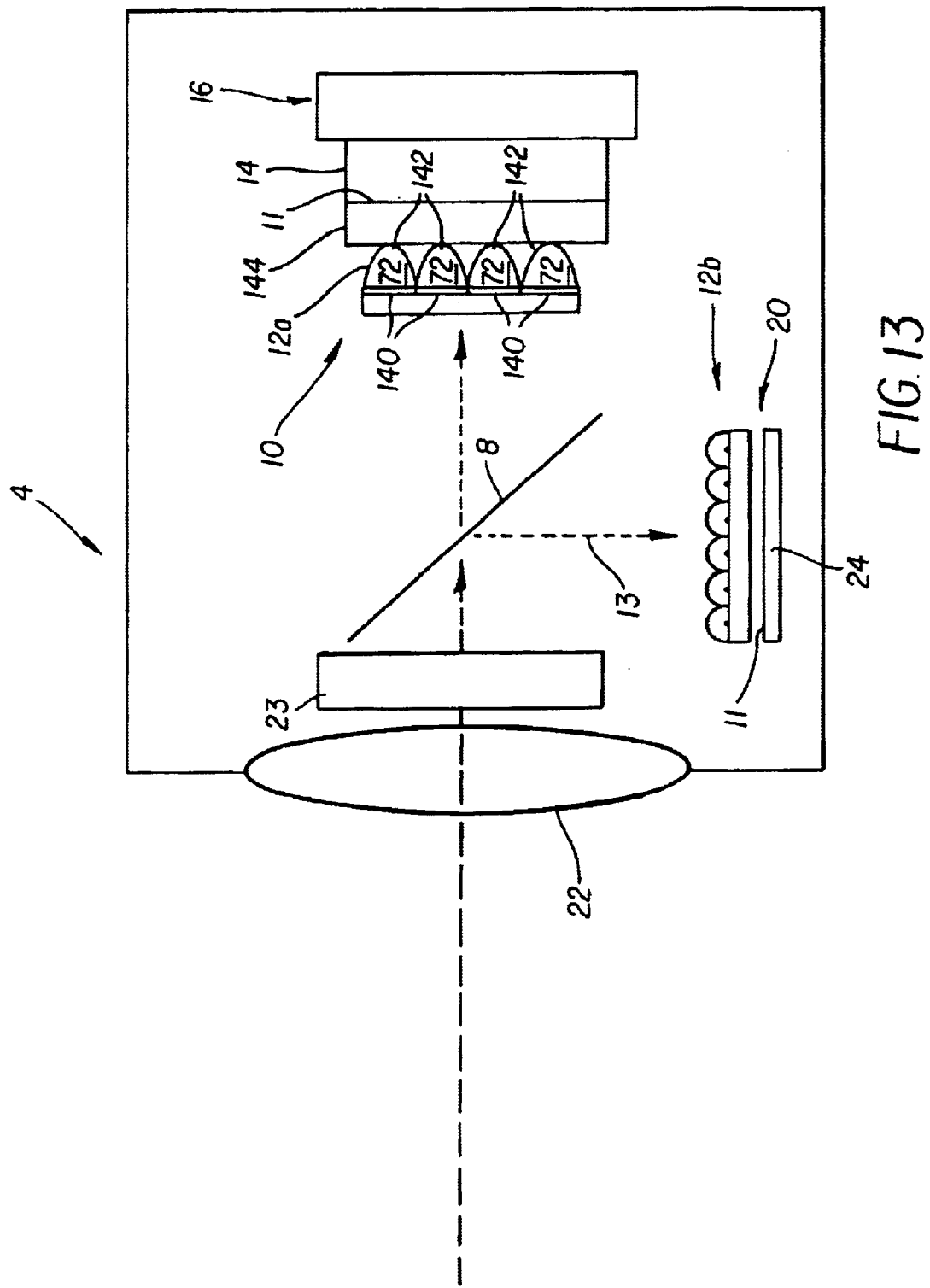
FIG. 13 is an illustration of another embodiment of an imaging system of the present invention.

FIG. 13 schematically illustrates another embodiment of an imaging system 4 having a first image capture system 10 comprising an image capture system for capturing images on a photosensitive element 14 and with a second image capture system 20 that captures images using an image capture sensor 24. Here, the imaging system 4 comprises a beam splitter 8, and a micro-lens array 12 having individual micro-lenses 72 positioned at the focal plane of the micro-lens array 12. On exposure, image light strikes beam splitter 8 and a portion of the light is passed to the first imaging surface 11 to expose photosensitive element 14, while the balance of the light is passed to the second imaging surface 21 to expose image sensor 24.

In the embodiment shown in FIG. 13, shutter system 23 modulates the passage of light from the scene to beam splitter 8 thus controlling exposure of both the light photosensitive element 14 and the image sensor 24. As is shown in this embodiment, micro-lens array 12a is provided for image capture system 10, while a second micro-lens array 12b is provided for second image capture system 20. Micro-lens array 12a is arranged with micro-lenses arranged in an inverse mounted arrangement, with each micro-lens 72 having a light receiving surface 140 to receive light from beam splitter 8 and a light focusing surface 142 confronting photosensitive element 14. Light focusing surface 142 is adapted to concentrate the received light onto photosensitive element 14. Spacer 144 positions photosensitive element 14 separate from the light focusing surfaces 142. The spacer can, for example, comprise any structure that is capable of providing a separation between light focusing surfaces 142 and photosensitive element 14. This arrangement is useful with an array of micro-lenses 12b having very fine pitch.

The individual micro-lenses 72 of array 12a and the surrounding medium, define a focal plane offset from the focusing surface of the micro-lenses 72. When imaging system 4 is loaded with light sensitive silver halide film 14, film 14 is positioned and aligned by film gate system 15 at the focal plane defined by the individual micro-lenses 72 and the surrounding medium.

In the aforesaid embodiments, the light sensitive film imaging system has been described as optionally employing a distinct micro-lens array. Other embodiments employing light sensitive films with emulsion side micro-lenses, with base side micro-lenses and with micro-lenses formed by partially embedded beads are specifically contemplated.

In another embodiment, a micro-lens array 12 assembly can be augmented by stacked array magnifier as described by U.S. Pat. No. 6,381,072 entitled Lenslet Array Systems And Methods, PCT filed by Burger on Jan. 23, 1998, to adjust image frame size as desired for particular applications. In this context, the stacked array magnifier enables the user optional use of multiple format films, i.e. films having distinct slit widths or frame sizes in one of the imaging systems. Further, the stacked array magnifier enables the user optional use of a film of one frame size in an imaging system in place of a solid state imager without necessity of grossly altering the optical properties of the camera. A specific embodiment is a camera with a first film based imaging system responsive to human visible images and a second imaging system that user optionally employs a solid state imager or a film imaging system responsive to human non-visible light, as in a security or observation camera.

Further details regarding the use of an array of micro-lenses 8 to improve image capture capacity regarding micro-lens reconstruction along with micro-lens sizing, shape and optical properties are disclosed in U.S. appl. Ser. No. 10/167,794, entitled "Imaging Using Silver Halide Films With Micro-Lens Capture And Optical Reconstruction," filed in the name of Irving et al. on Jun. 12, 2002 and U.S. appl. Ser. No. 10/170,148 entitled "Imaging Using Silver Halide Films With Micro-Lens Capture, Scanning And Digital Reconstruction," filed in the name of Szajewski et al. on Jun. 12, 2002, the disclosures of which are incorporated by reference. The combination of micro-lens arrays with solid state image capture devices are described in U.S. appl. Ser. No. 10/326,455 entitled "Digital Camera Having Extended Useful Latitude" filed in the name of Szajewski et al. on Dec. 20, 2002, and U.S. appl. Ser. No. 10/281,654 entitled "Inverse Mounted Micro-Lenses," of Szajewski et al., the disclosures of which are incorporated by reference.

In another embodiment, the first image capture system 10 and the second image capture system 20 can both capture images on photosensitive element 14 that can be used in combination with beam splitters 12, for example, to enable color separation exposures. Here, color filters can be used with pan sensitized photosensitive elements. Alternatively, the photosensitive elements can be specifically sensitized to the desired color sensitivity as known in the art. In yet another embodiment, two or more solid state image capture systems can be employed with separate imagers used in combination with multiple beam splitters to enable color separation exposures. The, color filters can be used to enable color specific image capture. The sensitivities can be the human visible red, green and blue triad, the complementary cyan, magenta yellow triad or can include UV, IR or far IR sensitivities as desired for specific applications.

The invention has been described in detail with particular reference to certain preferred embodiments thereof, but it will be understood that variations and modifications can be effected within the spirit and scope of the invention.

PARTS LIST 4 imaging system
5 user
6 taking lens unit
8 beam splitter
10 first image capture system
11 first imaging surface
12 micro-lens array
12a micro-lens array
12b micro-lens array
13 photosensitive element positioning system
14 photosensitive element
15 gate system
16 film supply system
17 pressure plate
18 photosensitive element contact surface
19 pressure plate assembly
20 second image capture system
21 second imaging surface
23 shutter system
24 image sensor
24 photosensors
25a photosensors in a residual image area
25b photosensors in a concentrated image area
26 element
27 inactive areas 28 element
30 lens driver
32 viewfinder system
33 viewfinder display
34 analog signal processor
35 viewfinder optics
36 A/D converter
38 frame memory
39 display driver
40 digital signal processor
42 exterior display
44 data memory
46 communication module
48 rangefinder
50 microprocessor
52 memory card
54 memory card slot
56 memory card interface
58 user controls
60 shutter trigger button
62 "wide" zoom lens button
63 accept button
64 "tele" zoom lens button
66 timing generator
68 sensor driver
72 dynamic range enhancement micro-lens
72a first set of micro-lens
72b second set of micro-lens
74 concentrated image area
74a first set of concentrated image areas
74b second set of concentrated image areas
75a line image exposure
75b line image exposure
76 residual image area
78 support
80 scene luminance range
82 actual photosensor latitude
84 lower response threshold
86 upper response threshold
88 desired system latitude
90 desired system lower response threshold
92 desired system upper response threshold
94 first range of scene exposure levels
96 second range of scene exposure levels
100 array of sensitivity enhancing micro-lenses
102 sensitivity enhancing micro-lenses
104 residual image
106 sensitivity enhancing concentrated light
108 concentrated light
120 detect trigger signal step
122 execute sensor exposure step
124 interrogate sensor step
126 extract image information from photosensors in concentrated image area step
128 extract image information from photosensors in residual image area
130 reconstruct image step
140 light receiving surface
142 light focusing surface
144 spacer
A first axis
B Second axis

What is claimed is:

1. An imaging system comprising:
a taking lens unit adapted to focus light from a scene;
a beam splitter receiving light from the scene with a portion of the received light traveling from the beam splitter to a first imaging surface and a portion of the received light traveling from the beam splitter to a second imaging surface;
a first image capture system for capturing an image based upon the light traveling to the first imaging surface;
a second image capture system for capturing a second image based upon the image formed at the second imaging surface; and
an array of micro-lenses in optical association with the second imaging surface, with each micro-lens in the array concentrating a first fraction of the light from the beam splitter onto concentrated image areas of the second imaging surface;
wherein the second image capture system forms an image based upon the light concentrated onto the concentrated image areas.

2. The imaging system of claim 1, wherein the array of micro-lenses also permits a second fraction of the light to form a residual image in areas of the associated imaging surface that surround the concentrated image areas.

3. The imaging system of claim 2, wherein the array of micro-lenses concentrates the first fraction of the light to form an image in the concentrated image areas of the second imaging surface when light from the scene is within a first range of exposure and wherein the second fraction of the light from the beam splitter forms an image in a residual image area surrounding the concentrated image areas of the second imaging surface when light from the scene is within a second, higher, range of exposures.

4. The imaging system of claim 3, wherein the second image capture system forms an image based upon the pattern of concentrated image elements and the image formed in the residual image area.

5. The imaging system of claim 4, wherein the first image capture system captures an image when light from the scene is within a third range of exposures, and wherein micro-lenses are selected so that the first range of exposures and the second range of exposures generally coincide with the third range of exposures.

6. The imaging system of claim 4, wherein the first image capture system captures an image when light from the scene is within a third range of exposures, and wherein micro-lenses are selected so that the first range of exposures and the second range of exposures coincide with at least 60% of the third range of exposures.

7. The imaging system of claim 1, wherein the micro-lenses concentrate light so that the appearance of the image captured by the second image capture system based upon the pattern of concentrated light generally corresponds to the appearance of the image captured by the first image capture system.

8. The imaging system of claim 1, wherein the micro-lenses concentrate light so that the second image capture system can capture images when the scene illumination is above a first lower response threshold and wherein the first image capture system is adapted to capture images when the scene illumination is at least above a second lower response threshold with the first lower response threshold being at least as low as the second lower response threshold.

9. The imaging system of claim 8, wherein first image capture system and second image capture system are optically associated with, respectively, a first array of micro-lenses and a second array of micro-lenses that are adapted so that the first image capture system and second image capture system are capable of capturing similar appearing images of a scene when exposed to a scene having a predefined range of illumination intensities.

10. The imaging system of claim 1, wherein a second array of micro-lenses is optically associated with the first image capture system, with each micro-lens in the second array concentrating a first fraction of the light traveling to the first imaging surface onto concentrated image areas of the first imaging surface and wherein the second image capture system forms an image based upon the concentrated image areas.

11. The imaging system of claim 1, wherein the fraction of light traveling to the second imaging surface is less than the fraction of light traveling to the first imaging surface.

12. The imaging system of claim 1, wherein the fraction of the light traveling to the second imaging surface is between 5%–95% of the light received by the beam splitter.

13. The imaging system of claim 1, wherein the beam splitter comprises at least one of a prism or a mirror.

14. The imaging system of claim 1, wherein the second imaging surface comprises an image sensor and the second image capture system comprises a processor and a display, wherein the processor collects image information from the image sensor, processes the image information and presents the images captured by the second image capture system on the display.

15. The imaging system of claim 14, wherein the display has a predefined display resolution that is less than an imaging resolution of the first imaging sensor and the array micro-lenses comprises an array of micro-lenses that concentrates light to form a pattern of concentrated image elements on the image sensor that corresponds to the display resolution of the display.

16. The imaging system of claim 1, wherein the second imaging surface comprises an image sensor having a plurality of photosensitive photosites and wherein there are fewer micro-lenses in the array of micro-lenses than there are photosites in the plurality of image sensing photosites.

17. The imaging system of claim 1, wherein the second imaging surface comprises an image sensor having an array of spaced photosensor areas and wherein each micro-lens in the array of micro-lenses receives light directed at more than one of the photosensors and concentrates a portion of the received light onto less than all of the photosensors at which the received light is directed.

18. The imaging system of claim 1, wherein the first imaging surface and the second imaging surface comprise image sensors that use photosensors to convert incident light into electrical charge.

19. The imaging system of claim 1, wherein at least one of the imaging surfaces comprises a photosensitive element having chemicals generate a latent image when exposed to light.

20. An image capture system comprising:
a taking lens unit adapted to focus light toward a beam splitter with the beam splitter receiving light from the taking lens unit and passing a portion of light to form an image at a first imaging surface and a portion of the light to form an image at a second imaging surface;
a photosensitive element image capture system having a shutter assembly for controlling the passage of light to at least one imaging surface and a photosensitive element positioning system having gate positioning a photosensitive element having the first imaging surface thereon to receive light controlled by the shutter assembly;
an electronic image capture system having an image sensor with the second imaging surface thereon said electronic image capture system adapted to capture an image based upon the light incident on the second imaging surface;
a micro-lens array in optical association with the second imaging surface imaging plane concentrating light directed at concentrated image areas of the second imaging surface; and
a controller for determining a capture time and for enabling the shutter assembly and electronic image capture system to capture an image representative of scene conditions during the capture time.

21. The image capture system of claim 20 wherein the shutter assembly is positioned so that the shutter controls the passage of light to every imaging surface.

22. The image capture system of claim 21 wherein the array of micro-lenses optically downsamples the image.

23. The image capture system of claim 21 wherein the controller determines a sensitivity for the photosensitive element, determines a capture time and causes the shutter assembly to open for the capture time and further causes the electronic image to capture an image based upon the scene conditions during the capture time.

24. The image capture system of claim 21, wherein the controller determines a sensitivity for the photosensitive element, determines a desired effective sensitivity for the photosensitive element image capture system based at least in part upon the sensitivity of the photosensitive element, and further causes the electronic image capture system to capture images in a manner that has an effective sensitivity that corresponds to the effective sensitivity of the photosensitive element image capture system.

25. The image capture system of claim 21 wherein the photosensitive element image capture system is adapted to receive a set of different types of photosensitive elements with each type of photosensitive element in the set having a different sensitivity, wherein the array of micro-lenses comprises an array having a set of different types of micro-lenses with each type of micro-lens concentrating light in a manner adapted to correspond to one type of the photosensitive elements so that the sensitivity of each different one of the photosensitive elements in the set can be matched by selectively forming an image based upon the light concentrated by the set of micro-lenses corresponding to a particular photosensitive element.

26. The image capture system of claim 25 wherein the processor is adapted to determine the sensitivity of a photosensitive element and to cause the electronic image capture system to capture images based upon light concentrated by micro-lenses that are associated with the type of micro-lens associated with the sensitivity of the photosensitive element.

27. The image capture system of claim 21 wherein the electronic image capture system begins an image capture sequence only when light from the scene strikes the image sensor.

28. The image capture system of claim 20 wherein the electronic image capture system incorporates a display and the electronic image capture system processes the captured image for presentation on the display.

29. The image capture system of claim 28, wherein the electronic image capture system resamples the captured image for presentation on the display.

30. The image capture system of claim 29, wherein the electronic image capture system incorporates a display and the electronic image capture system processes the captured image into a form that has an appearance that is adapted to generally correspond to the appearance of the image captured on the photosensitive element.

31. The imaging system of claim 28, wherein the display has a predefined display resolution that is less than an imaging resolution of the first imaging sensor and the array micro-lenses comprises an array of micro-lenses that concentrates light to form a pattern of concentrated image elements on the first imaging sensor with the pattern having a number of concentrated image elements that corresponds to the number of display elements.

32. The imaging system of claim 20, wherein the micro-lens array also permits a residual image of non-concentrated light to be formed on residual areas of the second imaging surface with the electronic image capture system comprising:

a display processor adapted to collect image information from concentrated images areas and from residual image areas of the image sensor to process the image information to form a captured image and to present the captured image on the display.

33. An imaging system comprising:

a taking lens unit adapted to focus light from a scene;

an image capture system for capturing an image based upon the light traveling to an imaging surface;

a stacked array magnifier positioned to alter the effective magnification of the light traveling to the imaging surface; and an array of micro-lenses in optical association with the imaging surface, with each micro-lens in the array concentrating a first fraction of the light onto concentrated image areas of the imaging surface;

wherein the image capture system forms an image based upon the light concentrated onto the concentrated image areas.

34. A method for capturing an image of a scene using a first imaging surface having a first sensitivity and a second imaging surface having a second sensitivity, the method comprising the steps of:

focusing light from the scene;

dividing the focused light from the scene into a first portion traveling to a first imaging surface and a second portion traveling to a second imaging surface;

capturing a first image based upon the light reaching the first imaging surface;

concentrating a fraction of the light traveling to the second imaging surface to form a pattern of concentrated image elements on the second imaging surface; and capturing a second image based upon the pattern of concentrated image elements formed on the second imaging surface.

35. The method of claim 34 wherein a second fraction of the light traveling to the second imaging surface is not concentrated and forms a residual image on areas of the first imaging surface that surround the concentrated image areas.

36. The method of claim 35 wherein the step of concentrating the light traveling to the second imaging surface comprises concentrating the light traveling to the second imaging surface so an image that is formed based upon the pattern of concentrated image elements appears to have been captured using an image capture surface having the sensitivity of the first image capture surface.

37. The method of claim 36, wherein the second image is formed based upon the pattern of concentrated image elements and the image formed in the residual image area.

38. The method of claim 36, wherein the first image comprises an image formed from light the scene that is within a third range of exposures, and wherein light is concentrated so that the first range of exposures and the second range of exposures generally coincide with the third range of exposures.

39. The method of claim 36, wherein the first images comprises an image formed from light from the scene that is within a third range of exposures, and wherein degree of light concentration is selected so that the first range of exposures and the second range of exposures coincide with at least 60% of the third range of exposures.

40. The method of claim 34 wherein the first fraction of the light traveling to the second imaging surface is concentrated to form an image in the concentrated image areas of the imaging surface when light from the scene is within a first range of exposure and wherein a second fraction of the light traveling to the second imaging surface forms an image in a residual image area surrounding the concentrated image areas of the second imaging surface when light from the scene is within a second, higher, range of illumination intensities.

41. The method of claim 34, wherein the micro-lenses concentrate light so that the appearance of the image captured by the second image capture system based upon the pattern of concentrated light generally corresponds to the appearance of the image captured by the first image capture system.

42. The method of claim 34, wherein light traveling to the second imaging surface is concentrated so that a first image can be captured using the concentrated light when the scene illumination is above a first lower response threshold and wherein the first image is captured when the scene illumination is at least above a second lower response threshold, with the first response threshold being at least as low as the second lower response threshold.

43. The method of claim 42, wherein the first image and second image have a similar appearance when exposed to a scene having a predefined range of illumination intensities.

44. The method of claim 34, wherein a fraction of the light traveling to the second imaging surface is concentrated onto concentrated image areas of the second imaging surface and wherein the second image is based upon the concentrated fraction of the light.

45. The method of claim 34, wherein the portion of light traveling to the second imaging surface is less than the portion of light traveling to the first image capture system.

46. The method of claim 34, wherein the portion of the light traveling to the second imaging surface is between 5%–95% of the light traveling to the second imaging surface.

47. The method of claim 34, wherein the second imaging surface comprises an electronic image sensor and the step of capturing a first image comprises capturing a second image by using the electronic image sensor to covert light incident on the first imaging surface into electronic signals.

48. The method of claim 47, further comprising the steps of processing the electronic signals into an image that can be presented on a display and presenting the image on the display.

49. The method of claim 48, wherein the display has a predefined display resolution defined by a number of display elements that is less than an imaging resolution of the electronic imaging sensor and the light traveling to the second imaging surface is concentrated to form a pattern of concentrated image elements on the electronic imaging sensor having a number of concentrated image elements that corresponds to the number of display elements.

50. The imaging system of claim 34, wherein the second imaging surface comprises an image sensor having a plurality of photosensitive photosites and wherein there are fewer micro-lenses in the array of micro-lenses than there are photosites in the plurality of image sensing photosites.

51. The method of claim 34, wherein the second imaging surface comprises an image sensor having an array of spaced photosensor areas and wherein light directed at the second imaging surface at an area containing more than one of the photosensors is concentrated onto less than all of the photosensors in the area at which the received light is directed.

52. The method of claim 34, wherein at least one of the steps of forming a first image and forming a second image comprise forming by converting light incident on one of the first and second imaging surfaces into electrical charge and processing the electrical charge to form a electronic signal representing the image.

53. The method of claim 34, wherein at least one of the imaging surfaces comprises a photosensitive element having chemicals that generate a latent image when exposed to light.

* * * * *